US012367845B2

(12) United States Patent
Kobashi

(10) Patent No.: US 12,367,845 B2
(45) Date of Patent: Jul. 22, 2025

(54) DISPLAY DEVICE

(71) Applicant: Japan Display Inc., Tokyo (JP)

(72) Inventor: Junji Kobashi, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 18/793,449

(22) Filed: Aug. 2, 2024

(65) Prior Publication Data

US 2025/0054457 A1 Feb. 13, 2025

(30) Foreign Application Priority Data

Aug. 7, 2023 (JP) ................................ 2023-128461

(51) Int. Cl.
*G09G 3/36* (2006.01)

(52) U.S. Cl.
CPC ... *G09G 3/3607* (2013.01); *G09G 2300/0842* (2013.01); *G09G 2320/0242* (2013.01)

(58) Field of Classification Search
None
See application file for complete search history.

(56) References Cited

U.S. PATENT DOCUMENTS

2007/0035707 A1* 2/2007 Margulis ................ H04N 9/312 353/122
2011/0032365 A1* 2/2011 Yett ........................ G02B 30/35 359/627
2011/0227487 A1* 9/2011 Nichol ................. G02B 6/0018 362/613
2011/0255303 A1* 10/2011 Nichol ................. G02B 6/0088 362/606
2011/0273906 A1* 11/2011 Nichol ................. G02B 6/0028 445/24
2014/0049983 A1* 2/2014 Nichol ................. G02B 6/0028 362/610
2014/0063853 A1* 3/2014 Nichol ................. G02B 6/0028 362/616

FOREIGN PATENT DOCUMENTS

JP 2015-038544 A 2/2015

* cited by examiner

*Primary Examiner* — Parul H Gupta
(74) *Attorney, Agent, or Firm* — K&L Gates LLP

(57) ABSTRACT

A display device includes: a light source device including a first light source, a second light source, and a third light source; a display; a storage configured to store data indicating a lighting pattern of the light source device; a controller configured to control the lighting pattern based on the input data and the data. The controller is configured to produce n lighting periods during a display output period of a frame image. Colors of light from the light source device during the n lighting periods differ from one another. The data includes information indicating lighting patterns that allow different color gamuts to be reproduced in the n lighting periods. The controller is configured to control, when the color reproduction changes, the lighting pattern based on a difference between the lighting pattern for the input data before the change and the lighting pattern for the input data after the change.

12 Claims, 15 Drawing Sheets

FIG.8

| | R | G | B |
|---|---|---|---|
| Ra | 1.0 | 0.0 | 0.0 |
| Ga | 0.0 | 1.0 | 0.0 |
| Ba | 0.0 | 0.0 | 1.0 |
| Rb | 0.6 | 0.2 | 0.2 |
| Gb | 0.2 | 0.6 | 0.2 |
| Bb | 0.2 | 0.2 | 0.6 |

| | CATEGORY NAME | COLOR GAMUT (SCHEMATIC DIAGRAM) |
|---|---|---|
| (HIGHER: BL3) PRIORITY | FOURTEENTH CATEGORY |  |
| (LOWER: BL4) | FIFTEENTH CATEGORY |  |

DISPLAY DEVICE

CROSS-REFERENCE TO RELATED APPLICATION

This application claims the benefit of priority from Japanese Patent Application No. 2023-128461 filed on Aug. 7, 2023, the entire contents of which are incorporated herein by reference.

BACKGROUND

1. Technical Field

What is disclosed herein relates to a display device.

2. Description of the Related Art

Display devices are known that perform display output using what is called a field-sequential color (FSC) system to control pixels so that the same pixel outputs light in a plurality of colors at different times (refer to Japanese Patent Application Laid-open Publication No. 2015-038544, for example).

In the FSC system, color reproduction of RGB images is generally achieved by outputting three colors of red (R), green (G), and blue (B) at different times. However, when light sources for primary colors such as red (R), green (G), and blue (B) are controlled to be switched between on (being lit) at high luminance and off (being unlit) in a very short cycle, color breaking is likely to occur.

For the foregoing reasons, there is a need for a display device that can further reduce the color breaking.

SUMMARY

According to an aspect, a display device includes: a light source device including a first light source configured to emit light in a first color, a second light source configured to emit light in a second color, and a third light source configured to emit light in a third color; a display configured to perform color reproduction based on input data from outside by using light from the light source device; a storage configured to store data indicating a lighting pattern of the first light source, the second light source, and the third light source; a controller configured to control the lighting pattern of the first light source, the second light source, and the third light source based on the input data and the data in the storage. The controller is configured to produce n lighting periods during a display output period of a frame image that is output by the display, and n is a natural number of three or larger. Colors of light emitted from the light source device during the n lighting periods differ from one another. The data includes information indicating a plurality of types of lighting patterns that allow different color gamuts to be reproduced in the n lighting periods. The controller is configured to control, when the color reproduction by the display changes, the lighting pattern of the first light source, the second light source, and the third light source based on a difference between the lighting pattern for the color reproduction corresponding to the input data before the change and the lighting pattern for the color reproduction corresponding to the input data after the change.

BRIEF DESCRIPTION OF THE DRAWINGS

FIG. 8 is a table of degrees of lighting of first, second, and third light sources that establish first red Ra, first green Ga, first blue Ba, second red Rb, second green Gb, and second blue Bb;

DETAILED DESCRIPTION

Figure 1:
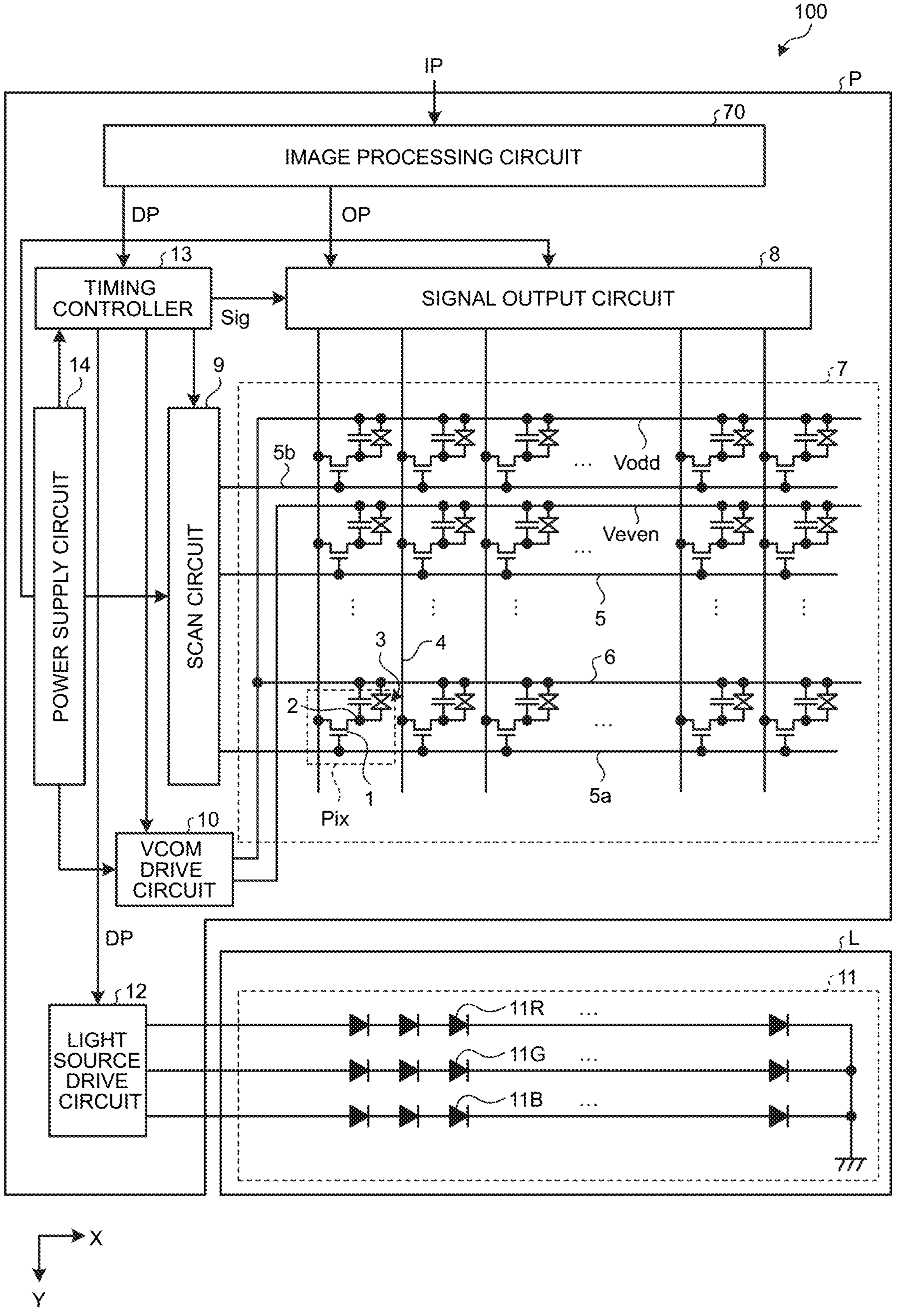
FIG. 1 is a schematic circuit diagram illustrating a main configuration of a display device.

The following describes embodiments of the present disclosure with reference to the drawings. What is disclosed herein is merely an example, and the present disclosure naturally encompasses appropriate modifications easily conceivable by those skilled in the art while maintaining the gist of the present invention. To further clarify the description, the drawings schematically illustrate, for example, widths, thicknesses, and shapes of various parts as compared with actual aspects thereof, in some cases. However, they are merely examples, and interpretation of the present disclosure is not limited thereto. The same element as that illustrated in a drawing that has already been discussed is denoted by the same reference numeral through the description and the drawings, and detailed description thereof will not be repeated in some cases where appropriate.

First Embodiment

FIG. 1 is a schematic circuit diagram illustrating a main configuration of a display device 100. The display device 100 includes a display panel P and a light source system L.

The display panel P includes a display 7, a signal output circuit 8, a scan circuit 9, a VCOM drive circuit 10, a timing controller 13, and a power supply circuit 14. Hereafter, one surface of the display panel P faced by the display 7 is referred to as "display surface" and the other surface is referred to as "back surface". A lateral side of the display device 100 refers to a side located, with respect to the display device 100, in a direction intersecting (for example, orthogonal to) a direction in which the display surface and the back surface face each other.

Figure 2:
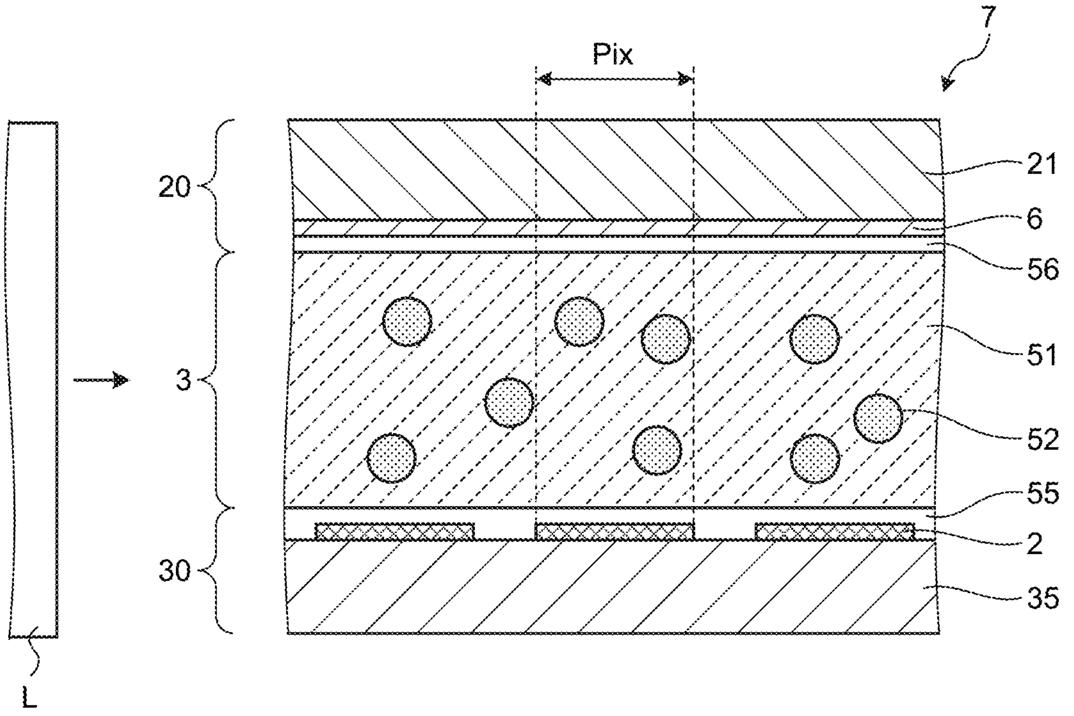
FIG. 2 is schematic view illustrating a schematic section of a display and a relation between the display and a light source system.

A plurality of pixels Pix are arranged in a matrix in a row-column configuration in the display 7. Each of the pixels Pix includes a switching element 1 and two electrodes. FIG. 1 and FIG. 2 to be explained below illustrate a pixel electrode 2 and a common electrode 6 as the two electrodes.

FIG. 2 is schematic view illustrating a schematic section of the display 7 and a relation between the display 7 and the light source system L. The display 7 includes two substrates facing each other and a liquid crystal 3 filled between the two substrates. Hereinafter, one of the two substrates is referred to as a first substrate 30, and the other of them is referred to as a second substrate 20.

The first substrate 30 includes a light-transmitting glass substrate 35, the pixel electrodes 2 stacked on the second substrate 20 side of the glass substrate 35, and an insulating layer 55 stacked on the second substrate 20 side so as to cover the pixel electrodes 2. The pixel electrode 2 is individually provided for each of the pixels Pix. The second substrate 20 includes a light-transmitting glass substrate 21, the common electrodes 6 stacked on the first substrate 30 side of the glass substrate 21, and an insulating layer 56 stacked on the first substrate 30 side of the common electrodes 6 so as to cover the common electrodes 6.

The common electrode 6 illustrated in FIG. 1 has a plate-like or film-like shape shared among the pixels Pix arranged in an X direction. The common electrodes 6 include common electrodes Vodd and common electrodes Veven. Among a plurality of the common electrodes 6 arranged in a Y direction, the common electrodes Vodd are the common electrodes 6 arranged in odd-numbered positions when counted from one end in the Y direction. The common electrodes Veven are the common electrodes 6 arranged in even-numbered positions when counted from the one end in the Y direction. In the configuration example described with reference to FIGS. 1 and 2, the pixel electrode 2 included in one of two pixels Pix adjacent in the Y direction faces a corresponding one of the common electrodes Vodd, and the pixel electrode 2 included in the other pixel Pix faces a corresponding one of the common electrodes Veven.

The liquid crystal 3 of the first embodiment is a polymer-dispersed liquid crystal (PDLC). Specifically, the liquid crystal 3 contains a bulk 51 and fine particles 52. The fine particles 52 change in orientation in the bulk 51 in accordance with a potential difference between the pixel electrode 2 and the common electrode 6. By individually controlling the potential of the pixel electrode 2 for each of the pixels Pix, the degree of at least either of optical transmission and scattering is controlled for each of the pixels Pix.

In the first embodiment described with reference to FIG. 2, the pixel electrode 2 faces the common electrode 6 so as to interpose the liquid crystal 3 therebetween. However, the display 7 may have a configuration in which the pixel electrode 2 and the common electrode 6 are provided on one substrate, and the orientation of the liquid crystal 3 is controlled by an electric field generated by the pixel electrode 2 and the common electrode 6.

The following describes a mechanism for controlling the potentials of the pixel electrode 2 and the common electrode 6. As illustrated in FIG. 1, the switching element 1 is a switching element using a semiconductor, such as a thin-film transistor (TFT). One of the source and the drain of the switching element 1 is coupled to one of the two electrodes (pixel electrode 2). The other of the source and the drain of the switching element 1 is coupled to a signal line 4. The gate of the switching element 1 is coupled to a scan line 5. Under the control of the scan circuit 9, the scan line 5 applies a potential for opening or closing a circuit between the source and the drain of the switching element 1. The scan circuit 9 controls the potential.

In the example illustrated in FIG. 1, the signal lines 4 are arranged along one of the arrangement directions (row direction) of the pixels Pix. The signal lines 4 extend along the other of the arrangement directions (column direction) of the pixels Pix. Each of the signal lines 4 is shared by the switching elements 1 of the pixels Pix arranged in the column direction. The scan lines 5 are arranged along the column direction. The scan lines 5 extend along the row direction. Each of the scan lines 5 is shared by the switching elements 1 of the pixels Pix arranged in the row direction.

In the description of the first embodiment, the X direction refers to the direction in which the scan lines 5 extend, and the Y direction refers to the direction in which the scan lines 5 are arranged. In FIG. 1, one of the scan lines 5 arranged at opposite ends in the Y direction is referred to as a scan line 5*a* and the other as a scan line 5*b*.

The common electrode 6 is coupled to the VCOM drive circuit 10. The VCOM drive circuit 10 provides the common electrode 6 with a potential that serves as a common potential. At the time when the scan circuit 9 provides a potential that serves as a drive signal to the scan line 5, the signal output circuit 8 outputs a pixel signal to be described later to the signal line 4 to charge storage capacitance generated between the pixel electrode 2 and the common electrode 6 and the liquid crystal (fine particles 52) that serves as a capacitive load. As a result, the voltage between the pixel Pix and the common electrode 6 becomes a voltage corresponding to the pixel signal. After the drive signal stops being provided, the storage capacitance and the liquid crystal (fine particles 52) serving as a capacitive load hold the pixel signal. The degree of scattering of the liquid crystal (fine particles 52) is controlled according to the voltage of each of the pixels Pix and the voltage of the common electrode 6. For example, the liquid crystal 3 may use a polymer-dispersed liquid crystal that increases in degree of scattering as the voltage between each of the pixels Pix and the common electrode 6 increases, or a polymer-dispersed liquid crystal that increases in degree of scattering as the voltage between each of the pixels Pix and the common electrode 6 decreases.

As illustrated in FIG. 2, the light source system L is located on the lateral side of the display 7. The light source system L includes a light source device 11 and a light source drive circuit 12. The light source device 11 includes a first light source 11R that emits red (R) light, a second light source 11G that emits green (G) light, and a third light source 11B that emits blue (B) light. The first light source 11R, the second light source 11G, and the third light source 11B each emit light under the control of the light source drive circuit 12. The first, the second, and the third light sources 11R, 11G, and 11B of the first embodiment are light sources using light-emitting elements such as light-emitting diodes (LEDs), but are not limited to such light sources, and only needs to be light sources controllable in light emission timing. The light source drive circuit 12 controls the light emission timing of the first, the second, and the third light sources 11R, 11G, and 11B under the control of the timing controller 13. In the first embodiment, red (R) is a first color. In the first embodiment, green (G) is a second color. In the first embodiment, blue (B) is a third color. In each sub-frame period SF and adjustment sub-frame period Ad to be described later, the first, the second, and the third light sources 11R, 11G, and 11B can each independently emit light, and two or three of the first, the second, and the third light sources 11R, 11G, and 11B can simultaneously emit light.

When light is emitted from the light source device 11, the display 7 is illuminated by the light emitted from one side surface side in the Y direction. Each of the pixels Pix transmits or scatters the light emitted from the one side surface side in the Y direction. The degree of the scattering depends on the state of the liquid crystal 3 controlled according to the pixel signal.

The timing controller 13 is a circuit that controls the operation timing of the signal output circuit 8, the scan circuit 9, the VCOM drive circuit 10, and the light source drive circuit 12. In the first embodiment, the timing controller 13 operates based on signals received through an image processing circuit 70. The power supply circuit 14 outputs various potentials necessary for operation of the display device 100 based on externally supplied power.

The image processing circuit 70 outputs signals based on frame image data IP from outside the display device 100 to the signal output circuit 8 and the timing controller 13. When "pixel data" denotes data indicating RGB gradation values assigned to one pixel Pix, the frame image data IP supplied to the image processing circuit 70 to output a frame image is a set of a plurality of pieces of the pixel data for a plurality of the pixels Pix provided in the display 7 and serves as input data.

The display device 100 performs display output using what is called a field-sequential color (FSC) system to control each pixel so that light in a plurality of colors is transmitted through the same pixel at times different from one another.

Figure 3:
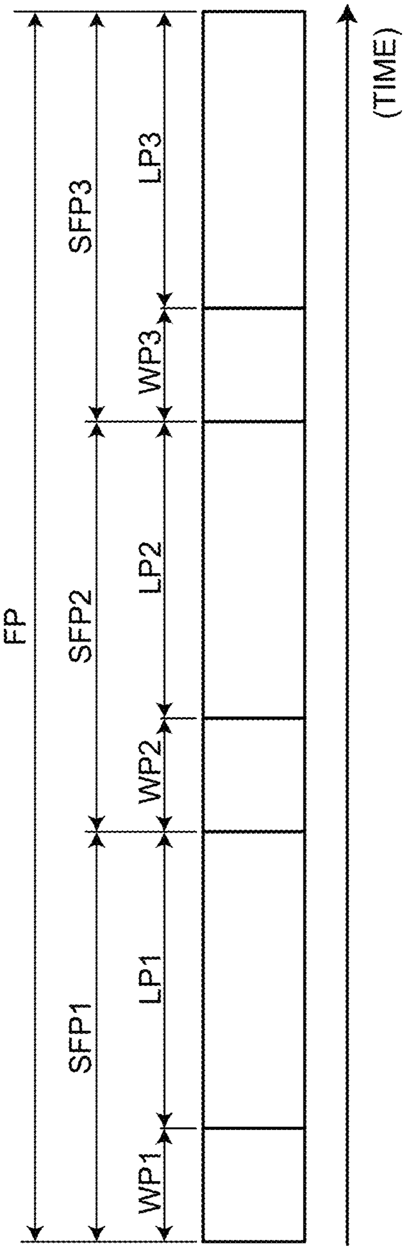
FIG. 3 is a schematic diagram illustrating a field-sequential color (FSC) system applied in a first embodiment of the present disclosure.

FIG. 3 is a schematic diagram illustrating the FSC system applied in the first embodiment. In the first embodiment, one frame period FP occurs each time the frame image data IP for one frame is input to the image processing circuit 70. That is, the display output of one frame image is performed according to each frame image data IP.

As illustrated in FIG. 3, the frame period FP includes a sub-frame period SFP1, a sub-frame period SFP2, and a sub-frame period SFP3. The sub-frame period SFP1 includes a writing period WP1 and a lighting period LP1 after the writing period WP1. The sub-frame period SFP2 includes a writing period WP2 and a lighting period LP2 after the writing period WP2. The sub-frame period SFP3 includes a writing period WP3 and a lighting period LP3 after the writing period WP3. The writing periods WP1, WP2, and WP3 are each a writing period. The writing period is a period in which a pixel signal according to a display output signal OP to be described later is given to each of the pixels Pix. The lighting periods LP1, LP2, and LP3 are each a lighting period. The lighting period is a period in which light is emitted from at least one or more of the first, the second, and the third light sources 11R, 11G, and 11B of the light source device 11 controlled according to the pixel signal written in the immediately preceding writing period.

For example, assuming that the pixel signal corresponding to the red (R) component among color components of the image output to be displayed according to the frame image data IP is written in the writing period WP1, color reproduction according to the red (R) component is performed by causing the first light source 11R to be on (lit) during the lighting period LP1 and causing the second and the third light sources 11G and 11B to be off (unlit). Assuming that the pixel signal corresponding to the green (G) component among color components of the image output to be displayed according to the frame image data IP is written in the writing period WP2, the color reproduction according to the green (G) component is performed by causing the second light source 11G to be on (lit) during the lighting period LP2 and causing the first and the third light sources 11R and 11B to be off (unlit). Assuming that the pixel signal corresponding to the blue (B) component among color components of the image output to be displayed according to the frame image data IP is written in the writing period WP3, the color reproduction according to the blue (B) component is performed by causing the third light source 11B to be on (lit) during the lighting period LP3 and causing the first and the second light sources 11R and 11G to be off (unlit).

When viewed over the entire frame period FP, the RGB color reproduction is performed by controlling the display output of the red (R) component during the sub-frame period SFP1, controlling the display output of the green (G) component during the sub-frame period SFP2, and controlling the display output of the blue (B) component during the sub-frame period SFP3. The FSC system is a system that ensures the RGB color reproduction to be achieved when viewed over the entire frame period FP.

Thus, the image processing circuit 70 produces n lighting periods (such as lighting periods LP1, LP2, and LP3) during the display output period (frame period FP) of the frame image output by the display panel P. The number n is a natural number of three or larger. In the description with reference to FIG. 3, n=3.

The above-described concept of assigning red (R), green (G), and blue (B) to the sub-frame periods SFP1, SFP2, and SFP3, respectively, has been merely introduced as the simplest example of the FSC system in order to more clearly explaining the FSC system. In the first embodiment, the control of the light source device 11 is applied correspondingly to categories to be described below.

Figure 4:
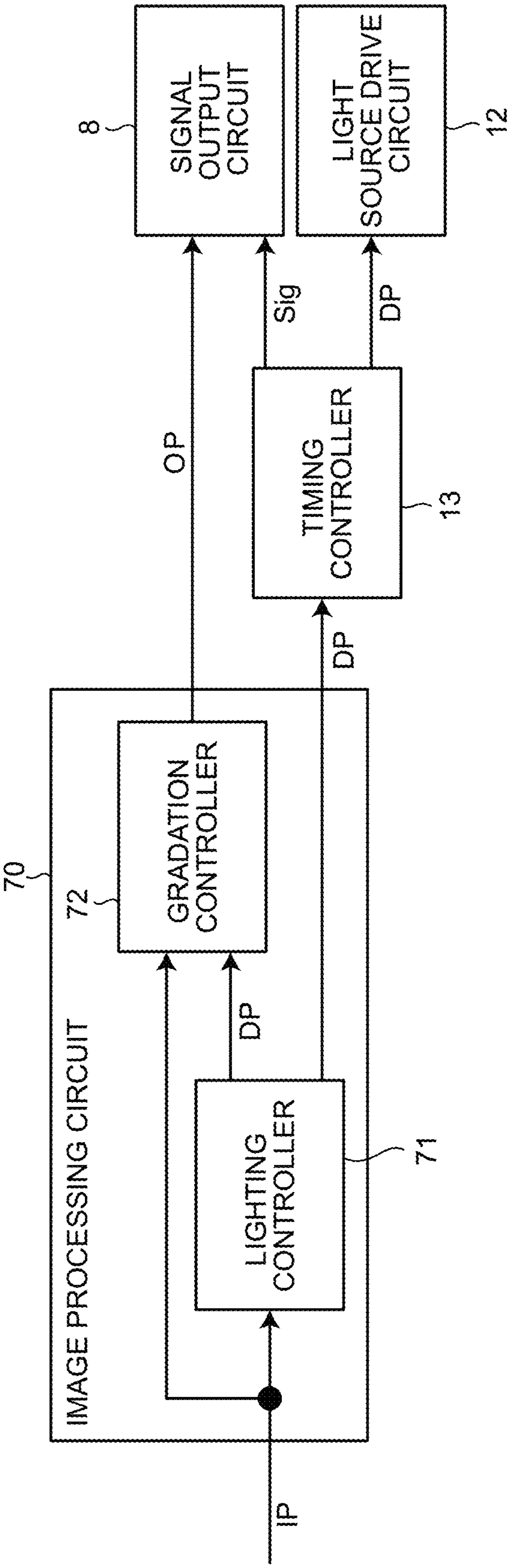
FIG. 4 is a block diagram illustrating a functional configuration of an image processing circuit.

FIG. 4 is a block diagram illustrating a functional configuration of the image processing circuit 70. The image processing circuit 70 includes a lighting controller (lighting control circuit) 71 and a gradation controller (gradation control circuit) 72. The lighting controller 71 generates a light source control signal DP based on the gradation values indicated by the pixel data contained in the frame image data IP. The light source control signal DP is a signal used to control the degree of lighting of the first, the second, and the third light sources 11R, 11G, and 11B. The light source control signal DP is output to the gradation controller 72 and the timing controller 13.

The gradation controller 72 outputs the display output signal OP based on the frame image data IP and the light source control signal DP. The display output signal OP contains pixel signals for performing the display output corresponding to the frame image data IP. The pixel signal written to the pixel Pix during the writing period described above is a pixel signal contained in the display output signal OP. During the operation of the pixel Pix according to the display output signal OP, the degree of lighting of the light from the light source device 11 is controlled according to the light source control signal DP. Therefore, the display output signal OP reflects gradation value control corresponding to the light thus controlled.

Assume, for example, a case where the gradation values indicated by the pixel data for one certain pixel Pix contained in the frame image data IP are (R, G, B)=(100, 100, 100). In this case, when the first, the second, and the third light sources 11R, 11G, and 11B are turned on at 100% luminance according to the light source control signal DP, the gradation values indicated by the pixel signal for the one pixel Pix in the display output signal OP are (R, G, B)=(100, 100, 100). That is, in this case, the gradation values indicated by the frame image data IP are equal to the gradation values indicated by the display output signal OP. In contrast, in a case where the first, the second, and the third light sources 11R, 11G, and 11B are turned on at 50% luminance according to the light source control signal DP, the luminance of the pixel Pix in the display output is insufficient when the gradation values of the pixel data in the frame image data IP are directly reflected in the pixel signals of the display output signal OP. Therefore, in this case, in the display output signal OP, the gradation values indicated by the pixel signal for the one pixel Pix are set to (R, G, B)=(200, 200, 200). As a result, the display output intended by the frame image data IP can be more faithfully reproduced. Thus, the display output signal OP reflects the pixel signal corresponding to the light from the light source device 11 that is produced during the frame period FP.

As illustrated in FIGS. 1 and 4, the timing controller 13 transmits the light source control signal DP to the light source drive circuit 12. The light source device 11 is turned on in accordance with the light source control signal DP under the control of the light source drive circuit 12. The timing controller 13 also outputs a synchronization control signal Sig to the signal output circuit 8. The synchronization control signal Sig is a synchronization signal output for the purpose of synchronizing the control of the display 7 according to the display output signal OP with the control of the light source device 11 according to the light source control signal DP.

Figure 5:
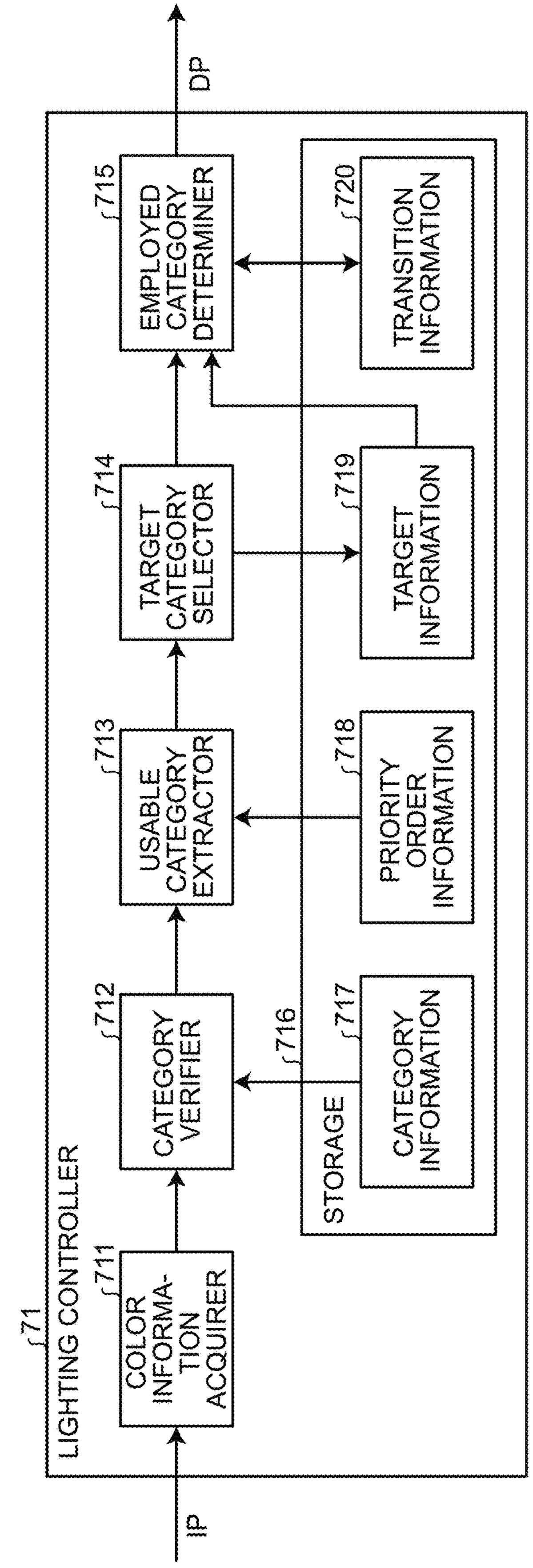
FIG. 5 is a block diagram illustrating a functional configuration of a lighting controller.

FIG. 5 is a block diagram illustrating a functional configuration of the lighting controller 71. The lighting controller 71 includes a color information acquirer (color information acquisition circuit) 711, a category verifier (category verification circuit) 712, a usable category extractor (usable category extraction circuit) 713, a target category selector (target category selection circuit) 714, an employed category determiner (employed category determination circuit) 715, and a storage (storage circuit) 716.

The color information acquirer 711 acquires color information on the image to be displayed according to the frame image data IP. Specifically, the color information acquirer 711 acquires the gradation values of R, G, and B indicated by the pixel data included in the frame image data IP. That is, the color information acquirer 711 acquires, from the gradation values, information on colors to be reproduced according to the gradation values.

The category verifier 712 verifies whether the color information on the image acquired by the color information acquirer 711 can be reproduced for each piece of predefined category information. The term "category information" herein is information indicating a lighting pattern of the light source device 11. Hereafter, the simple term "category" refers to the lighting pattern of the light source device 11, unless otherwise noted. The term "predefined category information" refers to information indicating each of a plurality of categories included in category information 717 to be described later, for example.

The following describes matters concerning a relation of the image to be displayed by the display device 100 with the categories, with reference to FIGS. 6 to 11.

Figure 6:
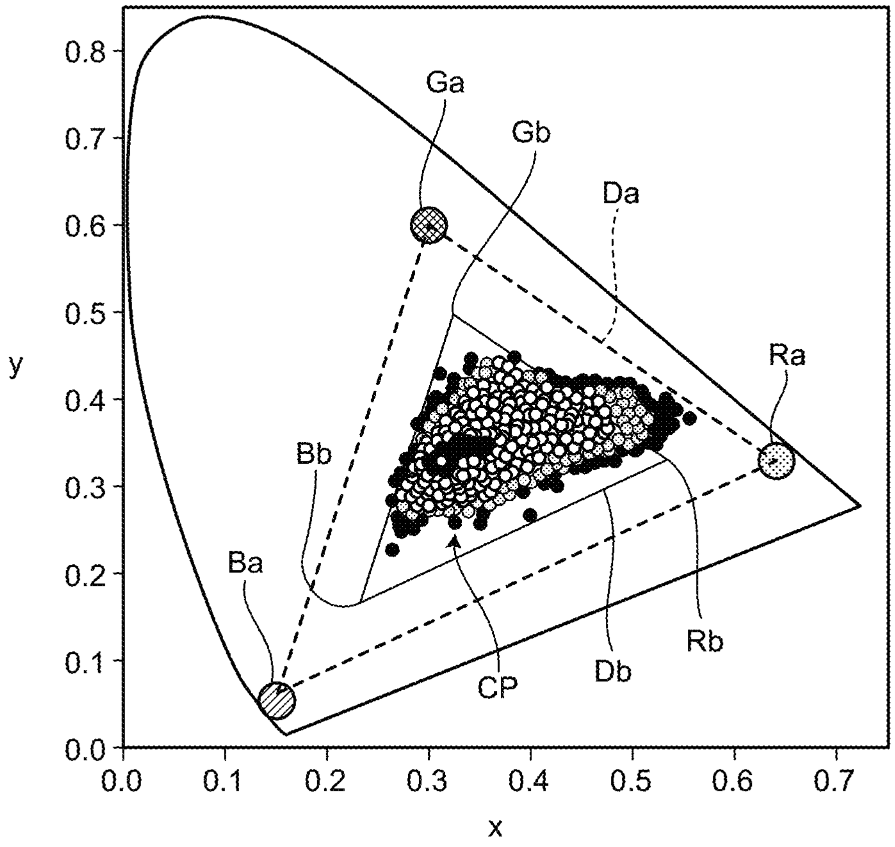
FIG. 6 is a diagram illustrating relations between a color pattern and two color gamuts.

FIG. 6 is a diagram illustrating relations between a color pattern CP and two color gamuts Da and Db. FIG. 6 illustrates the relations using an xy chromaticity diagram according to the CIE XYZ color system. The color pattern CP in FIG. 6 includes a plurality of white, black, and gray points distributed in the chromaticity diagram. The gray points are circular dots with dot patterns added thereto. Each of the white, black, and gray points indicates a color reproduced by the gradation values of the pixel data contained in the frame image data IP. The color pattern CP illustrates the colors reproduced by the respective pixels constituting one certain image that is to be displayed according to the frame image data IP.

The color gamut Da includes all the white, black, and gray points in the color pattern CP. Therefore, if a category is employed in which the light source device 11 is lit such that the display device 100 reproduces the color gamut Da, the colors included in the color pattern CP can be fully reproduced. In contrast, the gamut Db includes most of the white, black, and gray points in the color pattern CP, but does not include some of the white, black, and gray points included in the color pattern CP. Therefore, if a category is employed in which the light source device 11 is lit such that the display device 100 reproduces the color gamut Db, the colors of the pixels corresponding to points in the color pattern CP that are not included in the color gamut Db are not fully reproduced.

Figure 7:
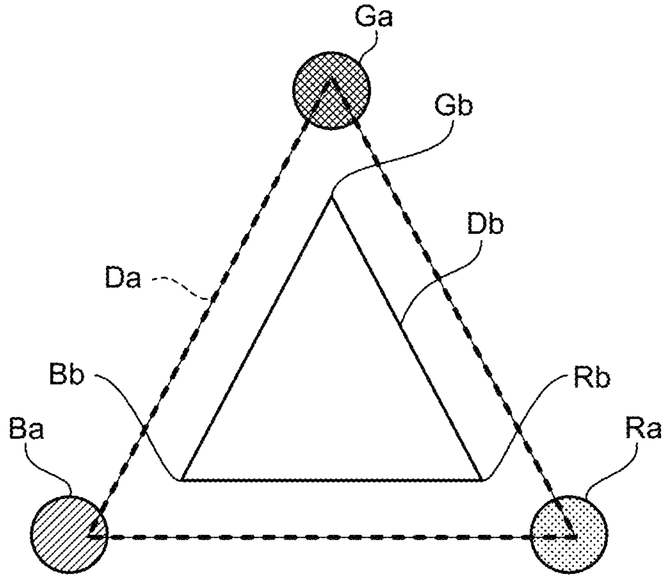
FIG. 7 is a schematic diagram illustrating the relation between the two color gamuts in a more simplified manner than in FIG. 6.

FIG. 7 is a schematic diagram illustrating the relation between the two color gamuts in a more simplified manner than in FIG. 6. FIG. 8 is a table of the degrees of lighting of the first, the second, and the third light sources 11R, 11G, and 11B that establish first red Ra, first green Ga, first blue Ba, second red Rb, second green Gb, and second blue Bb. The column "R" in the table in FIG. 8 indicates the degree of lighting of the first light source 11R. The column "G" in the table in FIG. 8 indicates the degree of lighting of the second light source 11G. The column "B" in the table in FIG. 8 indicates the degree of lighting of the third light source 11B. The numbers listed in the fields of the table in FIG. 8 are values that each indicate the degree of lighting of the light source as a ratio, with 0.0 being the minimum value and 1.0 being the maximum value. For example, if "0.0" is listed in the column, the light source is at the lowest luminance (0%), which has the same meaning as being off (unlit). If "1.0" is listed in the column, the light source is on (lit) at the highest luminance (100%).

As illustrated in FIG. 8, in the record of the first red Ra, the value is 1.0 in the column "R" and 0.0 in the other columns. That is, the first red Ra corresponds to the lighting pattern of the light source device 11 in which the first light source 11R is lit at the highest luminance and the second and the third light sources 11G and 11B are unlit. When interpreting the records of the first green Ga and the first blue Ba in the table of FIG. 8 in the same manner as the record of the first red Ra, the following can be found. That is, the first green Ga corresponds to the lighting pattern of the light source device 11 in which the second light source 11G is lit at the highest luminance and the first and the third light sources 11R and 11B are unlit. The first blue Ba corresponds to the lighting pattern of the light source device 11 in which the third light source 11B is lit at the highest luminance and the first and the second light sources 11R and 11G are unlit.

Hereafter, the term "first pattern" refers to the lighting pattern of the light source device 11 in which the first light source 11R is lit at the highest luminance and the second and the third light sources 11G and 11B are unlit. The term "second pattern" refers to the lighting pattern of the light source device 11 in which the second light source 11G is lit at the highest luminance and the first and the third light sources 11R and 11B are unlit. The term "third pattern" refers to the lighting pattern of the light source device 11 in which the third light source 11B is lit at the highest luminance and the first and the second light sources 11R and 11G are unlit.

The color gamut that can be reproduced by the display device 100 corresponds to the category, that is, the lighting pattern of the light source device 11. The color gamut Da illustrated in FIGS. 6 and 7 is established by employing the category based on a combination of the first pattern, the second pattern, and the third pattern. Such a category corresponds to a tenth category Ct0 in FIG. 11 to be explained later.

As described above, the display device 100 performs the color reproduction using the FSC system. Therefore, the fact that the color gamut Da is established in the display device 100 indicates that the lighting period during which the first pattern is applied, the lighting period during which the second pattern is applied, and the lighting period during which the third pattern is applied are generated so as to be different periods from one another in the display period of one frame of the image. In other words, to establish the color gamut Da, the period during which only the first light source 11R is lit at the highest luminance, the period during which only the second light source 11G is lit at the highest luminance, and the period during which only the third light source 11B is lit at the highest luminance need to be generated in one frame period. When the light sources for the primary colors are controlled to be switched between on (being lit) at high luminance and off (being unlit) in a very short cycle, color breaking is likely to occur. The light sources for the primary colors herein refer to the first light source 11R, the second light source 11G, and the third light source 11B. The high luminance refers to luminance of the light source when lit at or near the highest luminance (100%), unless otherwise noted.

The color breaking refers to a state in which a plurality of colors used to reproduce a certain color are individually visible. Assume, for example, a case where, in order to reproduce white at the highest luminance at a certain pixel Pix, the degree of scattering of light at that pixel Pix is set to the highest, and the first, the second, and the third light sources 11R, 11G, and 11B are lit at the highest luminance. In this case, the scattering of the red light that occurs during the period when the first light source 11R is on, the scattering of the green light that occurs during the period when the second light source 11G is on, and the scattering of the blue light that occurs during the period when the third light source 11B is on, overlap in the area of the pixel Pix. This operation should cause a user to view the area of the pixel Pix as a white area. In this case, however, the light sources for the primary colors (RGB) are controlled to be switched between on (being lit) at high luminance and off (being unlit) in a very short cycle. Consequently, the user may recognize the red light, the green light, and the blue light individually. Such a state in which the user can recognize the light of the individual colors is referred to as "color breaking". Although the color breaking has been described herein using the reproduction of white at the highest luminance as an example, the color breaking can also occur when other colors are reproduced if the light sources for the primary colors are controlled to be switched between on (being lit) at high luminance and off (being unlit) in a very short cycle.

As described above, the color breaking is more likely to occur when the category that establishes the color gamut Da is employed. Therefore, the first embodiment employs a mechanism that allows preferential use of categories that can more easily achieve both the color reproduction of images and the reduction of the color breaking.

For example, the color gamut Db illustrated in FIGS. 6 and 7 is established by the second red Rb, the second green Gb, and the second blue Bb. Therefore, when the category that establishes the color gamut Db is employed, a period of the second red Rb, a period of the second green Gb, and a period of the second blue Bb are generated in one frame period. According to FIG. 8, the second red Rb corresponds to the lighting pattern of the light source device 11 in which the first light source 11R is on (lit) at 60% luminance (0.6) and the second and the third light sources 11G and 11B are lit at 20% luminance (0.2). The second green Gb corresponds to the lighting pattern of the light source device 11 in which the second light source 11G is lit at 60% luminance (0.6) and the first and the third light sources 11R and 11B are lit at 20% luminance (0.2). The second blue Bb corresponds to the lighting pattern of the light source device 11 in which the third light source 11B is lit at 60% luminance (0.6) and the first and the second light sources 11R and 11G are lit at 20% luminance (0.2). That is, in the color gamut Db, the change in luminance of the light sources for the primary colors that occurs when switching between different lighting patterns falls within a range between 20% and 60% (+40%). This amount of change is significantly smaller than the amount of change in luminance of the light sources for the primary colors (+100%) when the color gamut Da is employed. Thus, the degree of change in luminance of the light sources for the primary colors is reduced in this manner, whereby the color breaking can be more easily reduced. Therefore, by employing the category that establishes the color gamut Db, the color breaking can be reduced compared with the case where the category that establishes the color gamut Da is employed.

However, it is undesirable to markedly impair the color reproductivity of images as a result of giving preference only to the reduction of color breaking. Therefore, the selection of categories preferably achieves both the color reproduction of images and the reduction of the color breaking. However, reproducing the gradation values of all the pixel data contained in the frame image data IP imposes a high processing load on the color information acquirer 711 and the category verifier 712. Therefore, in the first embodiment, for example, the pixel data contained in the frame image data IP is sampled, and categories that can each include the gradation values indicated by the sampled pixel data are regarded as usable categories to be described later.

Naturally, the gradation values of all the pixel data included in the frame image data IP may be subjects of processing by the color information acquirer 711 and the category verifier 712 so that the gradation values of all the pixel data contained in the frame image data IP can be included in the color gamut. The degree of sampling to be performed may be set as appropriate according to the balance between the number of pixels included in data assumed to be the frame image data IP (what is called the resolution) and the processing capacity of the color information acquirer 711 and the category verifier 712. As an example, in the first embodiment, 90% or more of the pixels having higher brightness or saturation are sampled in the frame image data IP of 1920×1080 pixels.

Figure 9:
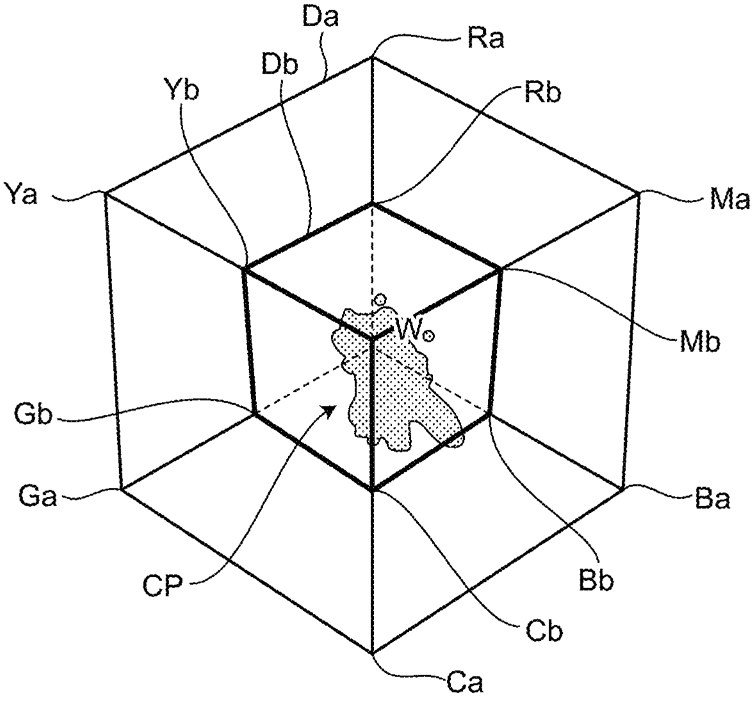
FIG. 9 is a diagram three-dimensionally illustrating the relations between the color pattern and the two color gamuts.
Figure 10:
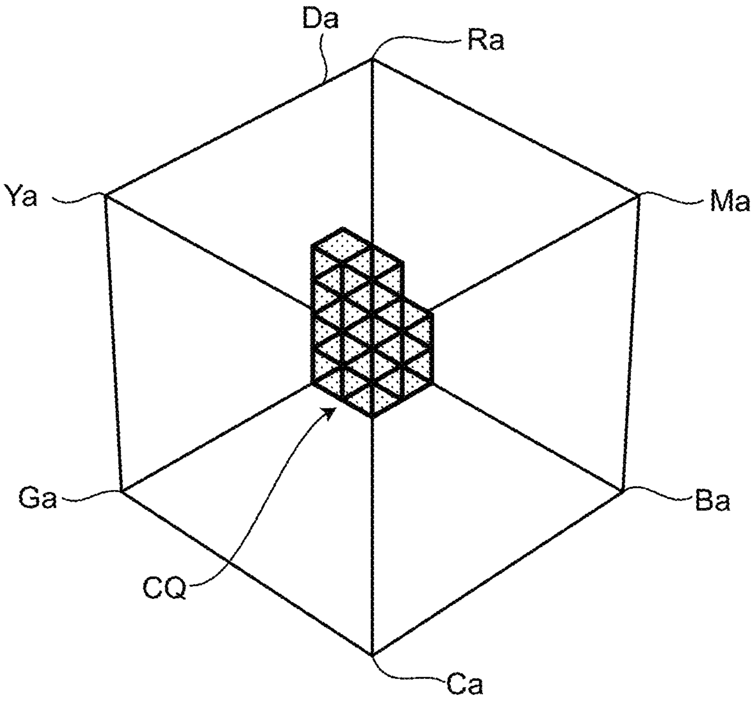
FIG. 10 is a schematic diagram three-dimensionally illustrating a relation between the color gamut and gradation values indicated by a sampled color gamut CQ based on sampled pixel signals.

FIG. 9 is a diagram three-dimensionally illustrating the relations between the color pattern CP and the two color gamuts Da and Db. FIG. 9 and FIG. 10 to be explained later illustrate a three-dimensional space with vertices at seven points: first red Ra, first green Ga, first blue Ba, yellow Ya, cyan Ca, magenta Ma, and white W. The yellow Ya corresponds to the lighting pattern of the light source device 11 in which the first and the second light sources 11R and 11G are lit at the highest luminance and the third light source 11B is unlit. The cyan Ca corresponds to the lighting pattern of the light source device 11 in which the second and the third light sources 11G and 11B are lit at the highest luminance and the first light source 11R is unlit. The magenta Ma corresponds to the lighting pattern of the light source device 11 in which the first and the third light sources 11R and 11B are lit at the highest luminance and the second light source 11G is unlit. The white W corresponds to the lighting pattern of the light source device 11 in which the first, the second, and the third light sources 11R, 11G, and 11B are lit at the highest luminance. FIG. 9 illustrates the color pattern CP in the form of a dot pattern in a solid-line frame. When the three-dimensional space is assumed to be a cube, the remaining one of eight vertices is one point at a location opposed to the white W and corresponds to black.

In the example illustrated in FIG. 9, most of the color pattern CP is contained within the color gamut Db. According to such a relation between the color gamut Db and the color pattern CP, the colors of most of an image corresponding to the color pattern CP can be reproduced by employing the category that establishes the color gamut Db. Therefore, when only a small portion of the pixel data of the color pattern CP is located outside the color gamut Db and not sampled, and the degradation of the quality of the reproduced image is within an allowable range, then the category that establishes the color gamut Db can be employed.

FIG. 10 is a schematic diagram three-dimensionally illustrating a relation between the color gamut Da and the gradation values indicated by the sampled color gamut CQ based on the sampled pixel data. Suppose that the sampled color gamut CQ represents a color gamut that covers the gradation values indicated by the pixel data obtained by sampling some pixel signals from all the pixel signals contained in the frame image data IP. In this case, any category that includes the sampled color gamut CQ can be employed in the first embodiment. The color breaking can be reduced by preferentially employing a category that correspond to a narrower color gamut than the color gamut Da, that is, a category in which the light sources for the primary colors are not on (not lit) at the highest luminance.

Figure 11:
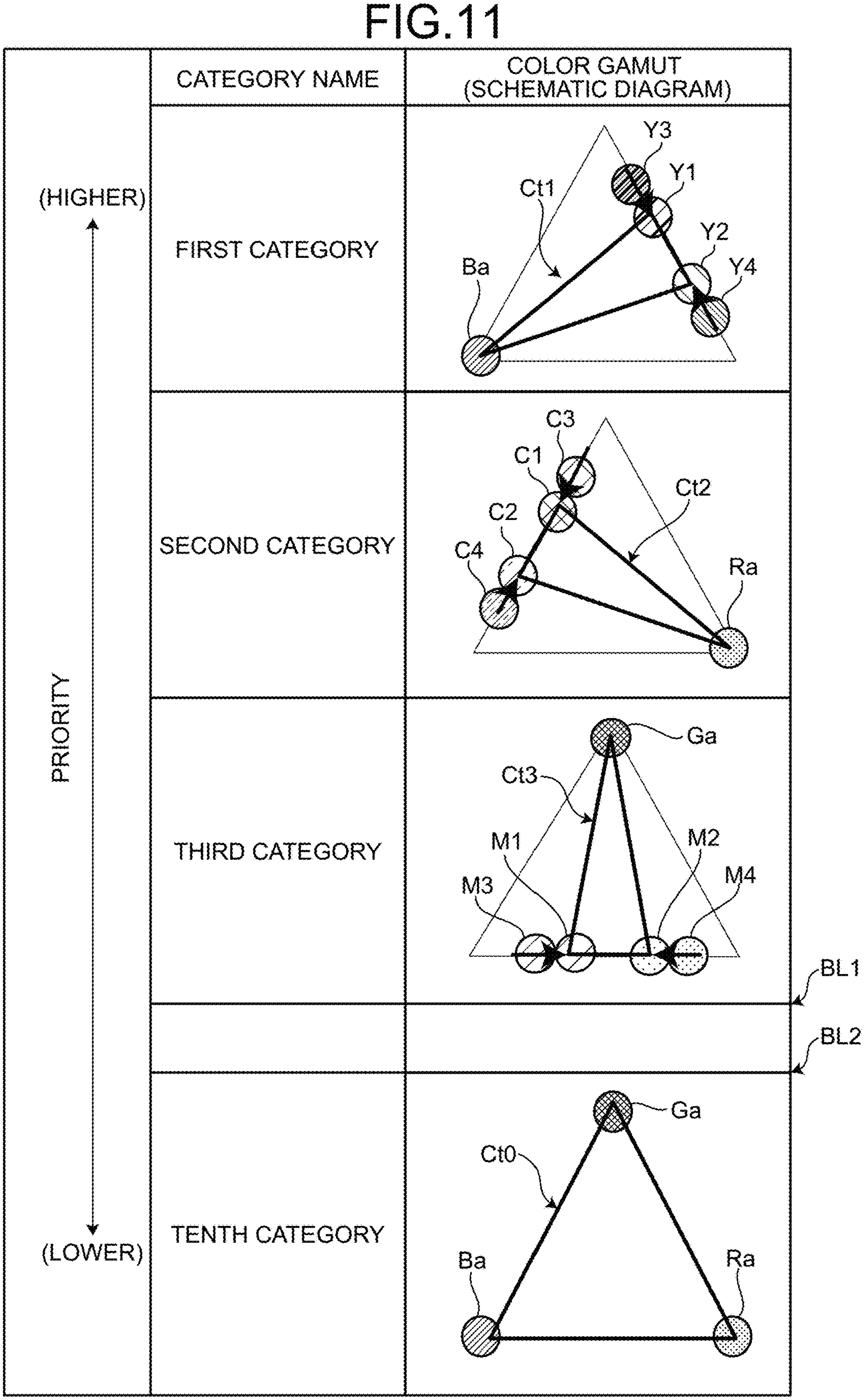
FIG. 11 is a table illustrating an exemplary relation between types of categories and degrees of priority of employment.

FIG. 11 is a table illustrating an exemplary relation between types of the categories and the degrees of priority of employment. FIG. 11 illustrates a first category Ct1, a second category Ct2, a third category Ct3, and the tenth category Ct0 as categories that can be used in the first embodiment.

A period of first yellow Y1, a period of second yellow Y2, and a period of the first blue Ba are generated in one frame period to establish the first category Ct1. The period of the first yellow Y1 and the period of the second yellow Y2 are periods when the first and the second light sources 11R and 11G are on and the third light source 11B is off. However, the luminance of the first light source 11R and the luminance of the second light source 11G are different between the first yellow Y1 and the second yellow Y2. In the first yellow Y1, the luminance of the second light source 11G is relatively higher than that of the first light source 11R. In the second yellow Y2, the luminance of the first light source 11R is relatively higher than that of the second light source 11G.

A period of first cyan C1, a period of second cyan C2, and a period of the first red Ra are generated in one frame period to establish the second category Ct2. The period of the first cyan C1 and the period of the second cyan C2 are periods when the second and the third light sources 11G and 11B are on and the first light source 11R is off. However, the luminance of the second light source 11G and the luminance of the third light source 11B are different between the first cyan C1 and the second cyan C2. In the first cyan C1, the luminance of the second light source 11G is relatively higher than that of the third light source 11B. In the second cyan C2, the luminance of the third light source 11B is relatively higher than that of the second light source 11G.

A period of first magenta M1, a period of second magenta M2, and a period of the first green Ga are generated in one frame period to establish the third category Ct3. The period of the first magenta M1 and the period of the second magenta M2 are periods when the first and the third light sources 11R and 11B are on and the second light source 11G is off. However, the luminance of the first light source 11R and the luminance of the third light source 11B are different between the first magenta M1 and the second magenta M2. In the first magenta M1, the luminance of the third light source 11B is relatively higher than that of the first light source 11R. In the second magenta M2, the luminance of the first light source 11R is relatively higher than that of the third light source 11B.

The tenth category Ct0 is equivalent to the color gamut Da described above. That is, the period of the first red Ra, the period of the first green Ga, and the period of the first blue Ba are generated in one frame period to establish the tenth category Ct0.

No matter which of the categories included in the category information 717 is applied to control the light source device 11, the luminance of the light source during each period included in each of the categories is preferably adjusted so as to equalize the balance of red (R), green (G), blue (B), and white (W) reproduced in one frame period.

The degrees of priority of a plurality of categories, such as the first category Ct1, the second category Ct2, the third category Ct3, and the tenth category Ct0, are set in advance. As illustrated in FIG. 11, in the first embodiment, the first category Ct1 has the highest degree of priority. The second category Ct2 has the second highest priority after the first category Ct1. The third category Ct3 has the third highest priority. The tenth category Ct0 has the lowest priority.

The relative degrees of priority of categories are preferably set so that those less likely to cause the color breaking have relatively higher degrees of priority. In the example illustrated in FIG. 11, the luminance change of the first and the second light sources 11R and 11G among the first, the second, and the third light sources 11R, 11G, and 11B is more easily recognized by the user than that of the third light source 11B. Thus, the highest degree of priority is given to the first category Ct1 that does not produce a period in which the first light source 11R is lit at the highest luminance nor a period in which the second light source 11G is lit at the highest luminance. The luminance change of the second light source 11G among the first, the second, and the third light sources 11R, 11G, and 11B is most easily recognized by the user. Thus, the higher degree of priority than that of the third category Ct3 and the tenth category Ct0 is given to the second category Ct2 that does not produce a period in which the second light source 11G is lit at the highest luminance.

The storage 716 illustrated in FIG. 5 stores therein the category information 717, priority order information 718, target information 719, and transition information 720. The storage 716 is a non-volatile storage circuit capable of rewritably storing data. The target information 719 and the transition information 720 are initialized at the start of operation of the display device 100.

The category information 717 includes information indicating each of the categories. Specifically, the category information 717 includes information indicating, for example, each of the first category Ct1, the second category Ct2, the third category Ct3, and the tenth category Ct0 illustrated in FIG. 11. That is, by referring to the category information 717, the category verifier 712 can identify, for each category, which lighting pattern of the light source device 11 is produced and in which color gamut the color reproduction can be achieved when the category is employed. One category contains data indicating n types of periods of time. In the first embodiment, in the information on each category, three periods of time for establishing the category are set correspondingly to n=3 described above. For example, the information on the tenth category Ct0 described above includes information indicating the period of the first red Ra, the period of the first green Ga, and the period of the first blue Ba.

The category verifier 712 verifies whether the color information on the image acquired by the color information acquirer 711 can be reproduced, for each piece of the category information 717 except that on the tenth category Ct0. In other words, the category verifier 712 performs a process to individually verify, for each category, whether the color reproduction can be achieved correspondingly to the color information acquired by the color information acquirer 711 based on the frame image data IP.

The reason why the tenth category Ct0 is not subject to the verification is that, if the color reproduction cannot be achieved for categories other than the tenth category Ct0, the tenth category Ct0 that has the widest color gamut among all categories is employed by a process of elimination.

In the first embodiment, the category verifier 712 selects, as a target for verification, the color information based on the sampled pixel data from among pieces of the color information to be reproduced by the gradation values indicated by a plurality of pieces of the pixel data included in the image, which have been acquired by the color information acquirer 711 based on the frame image data IP.

The usable category extractor 713 illustrated in FIG. 5 extracts, based on the processing performed by the category verifier 712, categories that allow the color reproduction corresponding to the color information acquired by the color information acquirer 711 based on the frame image data IP to be achieved, from among the categories included in the category information 717. When performing such extraction, the usable category extractor 713 adds information obtained by referring to the priority order information 718.

Specifically, the usable category extractor 713 extracts categories as usable categories and generates information indicating the categories extracted as the usable categories. The categories extracted as the usable categories are categories verified by the category verifier 712 as categories that allow the color gamut to contain the color information based on the sampled pixel data. That is, categories not extracted as the usable categories are categories determined by the category verifier 712 to be categories with which the color information based on the sampled pixel data is outside the color gamut.

The priority order information 718 includes information indicating the degrees of priority of a plurality of categories included in the category information 717. Specifically, the priority order information 718 includes information indicating relative degrees of priority of the first category Ct1, the second category Ct2, the third category Ct3, and the tenth category Ct0 illustrated in FIG. 11, for example. The usable category extractor 713 adds information indicating the degrees of priority of the usable categories to the information indicating the categories extracted as the usable categories, with reference to the priority order information 718.

The target category selector 714 selects, as the target category, a category having the highest degree of priority from among the categories extracted as the usable categories by the usable category extractor 713. The target category selector 714 stores information indicating the target category as the target information 719 in the storage 716.

However, if the display output of the display device 100 is in a colorless state Bak to be described later, the tenth category Ct0 may be the target category regardless of whether the degree of priority is high or low.

The employed category determiner 715 generates and outputs the light source control signal DP with reference to the target information 719 and the transition information 720. The following describes a mechanism for generation of the light source control signal DP by the employed category determiner 715 with reference to FIG. 12.

Figure 12:
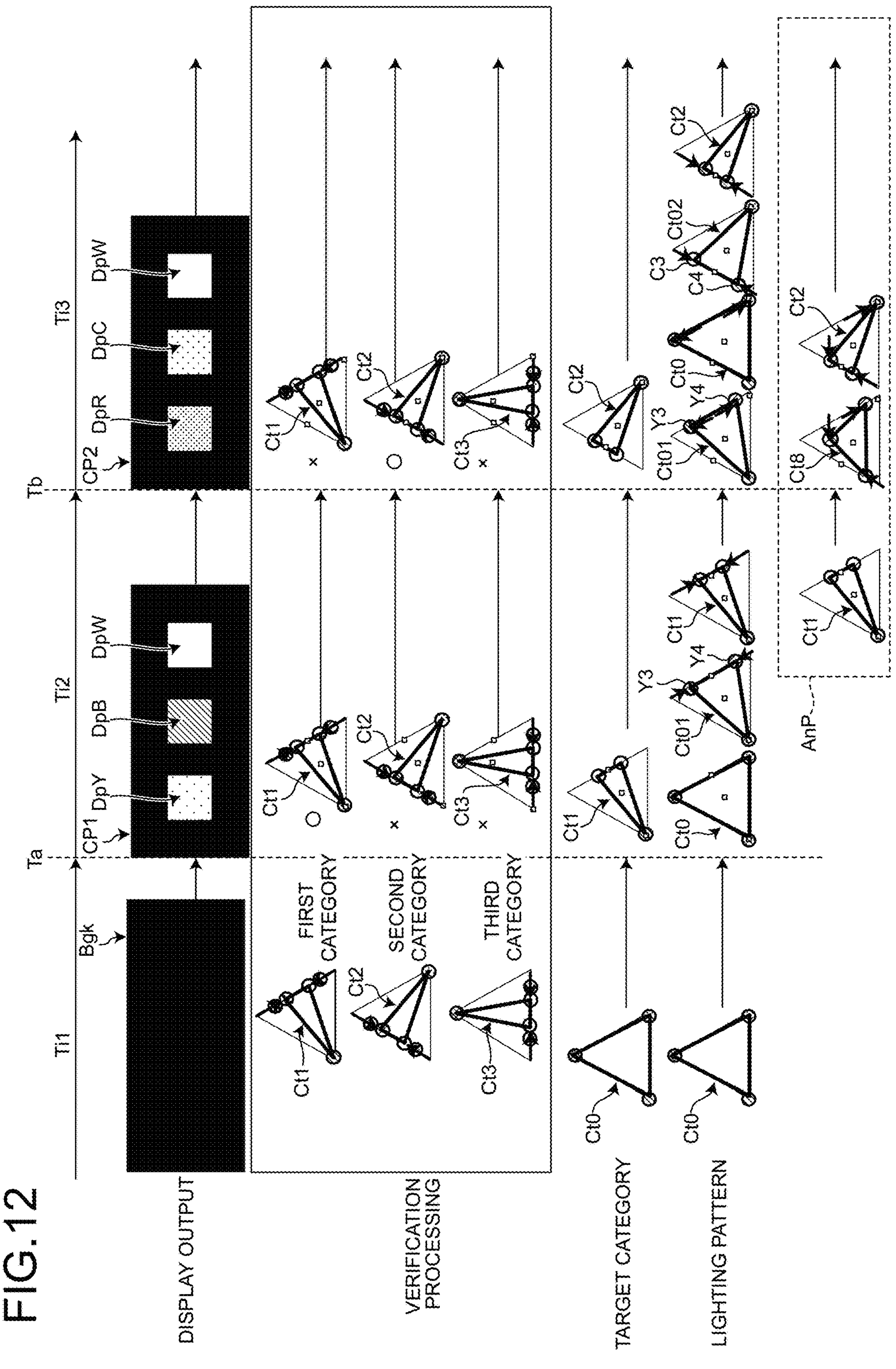
FIG. 12 is a schematic diagram illustrating relations between transition of display output, verification of the categories, selection of a target category, and changes in lighting pattern of a light source device.

FIG. 12 is a schematic diagram illustrating relations between transition of the display output, the verification of the categories, the selection of the target category, and changes in the lighting pattern of the light source device 11. FIG. 12 illustrates a case where the display output is changed at time Ta between a period Ti1 and a period Ti2, and at time Tb between the period Ti2 and a period Ti3. The period Ti1 is a period after the display device 100 starts operating and before the frame image data IP is received at time Ta. The period Ti2 is the display output period corresponding to the frame image data IP after the frame image data IP is received at time Ta and is a period before the frame image data IP is received at time Tb. The period Ti3 is the display output period corresponding to the frame image data IP after the frame image data IP is received at time Tb. Time Ta and time Tb each indicate time when the frame image data IP different from the frame image data before time Ta and time Tb is received. That is, time Ta and time Tb are each update time of the display output.

First, in the period Ti1, the display output of the display device 100 according to the frame image data IP is placed in the colorless state Bak. The display 7 controlled corresponding to the colorless state Bak has the lowest degree of scattering of light in all the pixels. The colorless state Bak is established when, for example, all the pixel data included in the frame image data IP is (R, G, B)=(0, 0, 0). The mechanism may be such that the colorless state Bak is established when the frame image data IP has not yet been received after the display device 100 started operating.

In the first embodiment, during the period Ti1 in which the display output is in the colorless state Bak, the target category and the lighting pattern are set to the tenth category Ct0. This setting is made in consideration of ease of transition from the category for the colorless state Bak to another category for another display output other than the colorless state Bak. The details will be described later.

In FIG. 12, the display output transitions from the colorless state Bak to a first image CP1 at time Ta. The first image CP1 includes a yellow area DpY, a blue area DpB, and a white area DpW. The yellow area DpY is reproduced by the scattering of the red light at high luminance and the green light at high luminance. The blue area DpB is reproduced by the scattering of the blue light at high luminance. The white area DpW is reproduced by the scattering of the red light at high luminance, the green light at high luminance, and the blue light at high luminance.

At time Ta, the color information acquirer 711 acquires the color information on the first image CP1. The category verifier 712 samples the color information on the first image CP1 and verifies whether color reproduction of the first image CP1 is possible in each of the first category Ct1, the second category Ct2, and the third category Ct3. It is herein assumed that the color information on the yellow area DpY, the blue area DpB, and the white area DpW have all been included in the sampling.

The first category Ct1 can reproduce the yellow area DpY, the blue area DpB, and the white area DpW. In contrast, the second category Ct2 and the third category Ct3 cannot reproduce the yellow area DpY. Therefore, the usable category extractor 713 extracts the first category Ct1 as a usable category. As described above, the information indicating the degree of priority is also added to the information indicating the usable categories, but, in the example at time Ta, only the first category Ct1 is the usable category, so that the target category selector 714 automatically selects the first category Ct1 as the target category. Therefore, during the period Ti2, the target information 719 is information indicating the first category Ct1. In FIG. 12, the target category from time Ta to time Tb is the first category Ct1.

The first embodiment herein employs a mechanism that can further reduce the color breaking. Specifically, as illustrated in the row "lighting pattern" in FIG. 12, in a process of changing the lighting pattern of the light source device 11 from the tenth category Ct0 before time Ta to the first category Ct1 that is the target category after time Ta, control is applied to produce an intermediate category between the tenth category Ct0 and the first category Ct1.

FIG. 12 illustrates a category Ct01 as an intermediate category between the tenth category Ct0 and the first category Ct1. A period of third yellow Y3, a period of fourth yellow Y4, and the period of the first blue Ba are generated in one frame period to establish the category Ct01. The period of the third yellow Y3 and the period of the fourth yellow Y4 are periods when the first and the second light sources 11R and 11G are on and the third light source 11B is off. However, the luminance of the first light source 11R and the luminance of the second light source 11G are different between the third yellow Y3 and the fourth yellow Y4. In the third yellow Y3, the luminance of the second light source 11G is relatively higher than that of the first light source 11R. In the fourth yellow Y4, the luminance of the first light source 11R is relatively higher than that of the second light source 11G. Furthermore, the luminance of the second light source 11G is relatively higher and the luminance of the first light source 11R is relatively lower for the third yellow Y3 than for the first yellow Y1. In addition, the luminance of the first light source 11R is relatively higher and the luminance of the second light source 11G is relatively lower for the fourth yellow Y4 than for the second yellow Y2.

The tenth category Ct0, the category Ct01, and the first category Ct1 are common in that the period of the first blue Ba is generated. Therefore, during the period Ti2, no change occurs in that the third light source 11B is lit at high luminance during the period of the first blue Ba. In contrast, the tenth category Ct0 differs from the first category Ct1 in that the period of the first red Ra and the period of the first green Ga are generated in the tenth category Ct0 while the period of first yellow Y1 and the period of the second yellow Y2 are generated in the first category Ct1. If the lighting pattern of the light source device 11 is rapidly changed from the tenth category Ct0 to the first category Ct1, the period of the first red Ra is suddenly replaced with the period of the first yellow Y1, and the period of the first green Ga is suddenly replaced with the period of the second yellow Y2. A sudden change in luminance distribution of the light source device 11 caused by such a sudden replacement may trigger the user to recognize the color breaking.

Therefore, in the first embodiment, an intermediate category, such as the category Ct01, between the tenth category Ct0 and the first category Ct1 is provided during a transitional period from the tenth category Ct0 to the first category Ct1. As a result, the period of the first red Ra in the tenth category Ct0 transitions to the period of the first yellow Y1 in the first category Ct1 via the period of the third yellow Y3 in the category Ct01. In this transition, the luminance of the first light source 11R is sequentially reduced for each sequential lapse of the period of the first red Ra, the period of the third yellow Y3, and the period of the first yellow Y1. The luminance of the second light source 11G is sequentially increased for each sequential lapse of the period of the first red Ra, the period of the third yellow Y3, and the period of the first yellow Y1. The period of the first green Ga in the tenth category Ct0 transitions to period of the second yellow Y2 in the first category Ct1 via the period of the fourth yellow Y4 in the category Ct01. In this transition, the luminance of the second light source 11G is sequentially reduced for each sequential lapse of the period of the first green Ga, the period of the fourth yellow Y4, and the period of the second yellow Y2. The luminance of the first light source 11R is sequentially increased for each sequential lapse of the period of the first green Ga, the period of the fourth yellow Y4, and the period of the second yellow Y2.

In this manner, when changing the categories in accordance with the transition of the display output, the probability of occurrence of visible color breaking due to the sudden change in the color of the light from the light source device 11 can be further reduced by producing the intermediate category between the categories before and after the change. Thus, the color breaking can be further reduced by producing the intermediate category. At time Ta in FIG. 12, the tenth category Ct0 is the category before the change; the first category Ct1 is the category after the change; and the category Ct01 is the intermediate category.

Thus, in the case where the color reproduction by the display panel P changes, the image processing circuit 70 controls the lighting pattern of the first light source 11R, the second light source 11G, and the third light source 11B based on the difference between the lighting pattern for the color reproduction according to the frame image data IP before the change and the lighting pattern for the color reproduction according to the frame image data IP after the change. The category before the change described above corresponds to the lighting pattern for the color reproduction according to the frame image data IP before the change. The category after the change described above corresponds to the lighting pattern for the color reproduction according to the frame image data IP after the change. The term "case where the color reproduction by the display panel P changes" herein also includes, for example, a case where the state changes from a non-input state to an input-start state. The non-input state is a state where the frame image data IP is not yet received, and the input-start state is a state where the frame image data IP starts to be received. In that case, the "frame image data IP before the change" is regarded to be the frame image data IP in which all the gradation values of all the pixel data are 0.

The image processing circuit 70 produces a transitional period between first time and second time. The first time is time at which the lighting pattern for color reproduction corresponding to the frame image data IP before the change is applied. The second time is time at which the lighting pattern for color reproduction corresponding to the frame image data IP after the change is applied. The transitional period is a period during which a lighting pattern different from both that of the first time and that of the second time is applied. In the case of the example illustrated in FIG. 12, for example, time before the time Ta corresponds to the first time. Time when the category after the change (first category Ct1) is applied after the time Ta corresponds to the second time. The period during which the intermediate category is applied corresponds to the transitional period. Herein, a first difference and a second difference are smaller than a third difference. The first differences is the difference between the color of the light emitted from the light source device 11 during the transitional period and the color of the light emitted from the light source device 11 at the first time. The second difference is the difference between the color of the light emitted from the light source device 11 during the transitional period and the color of the light emitted from the light source device 11 at the second time. The third difference is the difference between the color of the light emitted from the light source device 11 at the first time and the color of the light emitted from the light source device 11 at the second time. That is, the difference in color of light between the tenth category Ct0 and the category Ct01 and the difference in color of light between the category Ct01 and the first category Ct1 are smaller than the difference in color of light between the tenth category Ct0 and the first category Ct1 before and after the change. More specifically, the difference in color of light between the tenth category Ct0 and the category Ct01 and the difference in color of light between the category Ct01 and the first category Ct1 are smaller than the difference in color of light between the tenth category Ct0 and the first category Ct1, in terms of the difference between the luminance of red (R) and the luminance of green (G) during two of the three lighting periods that are generated in one frame period.

At the time when information indicating a selected category is newly stored as the target information 719, information indicating a category corresponding to the light source control signal DP that has been applied to the control of the light source device 11 immediately before that time is stored as the transition information 720 illustrated in FIG. 5. That is, at the time before time Ta, information indicating the tenth category Ct0 is stored as the transition information 720. When the storage 716 does not store any information as the target information 719 or the transition information 720, such as immediately after the display device 100 has started operating, control may be applied assuming that the information on the tenth category Ct0 is stored.

The employed category determiner 715 refers to the target information 719 and the transition information 720, and if the target information 719 matches the transition information 720, the employed category determiner 715 generates the light source control signal DP to apply the control corresponding to a category stored as the target information 719 and the transition information 720 to the light source device 11. The light source control signal DP generated by the employed category determiner 715 is output to the gradation controller 72 and the timing controller 13, as described with reference to FIG. 4.

After the time Ta, when the first category Ct1 is extracted by the usable category extractor 713, the information indicating the first category Ct1 is stored as the target information 719 by the target category selector 714. At the time when the information indicating the first category Ct1 is stored as the target information 719, the information on the tenth category Ct0 is still stored as the transition information 720.

The employed category determiner 715 refers to the target information 719 and the transition information 720, and if the target information 719 differs from the transition information 720, the employed category determiner 715 performs a process to make a transition of the control to be applied to the light source device 11 to a control corresponding to the category indicated by the information stored as the transition information 720. The transition process is performed over a predetermined time from the time when the target information 719 has become different from the transition information 720. Specifically, for example, as described above, the light source control signal DP is generated so as to apply the intermediate category (such as the category Ct01) between the tenth category Ct0 and the first category Ct1 to the light source device 11. After the elapse of the predetermined time, the light source control signal DP is generated to apply the control corresponding to the category (such as the first category Ct1) indicated by the information stored as the transition information 720 to the light source device 11.

The number of intermediate categories is not limited to one, and a plurality of steps may be provided in order to cause the transition from the lighting pattern before the change to the lighting pattern after the change to be more gradual. For example, at least one or more intermediate categories may be further applied between the tenth category Ct0 and the category Ct01 and/or between the category Ct01 and the first category Ct1, in FIG. 12. The predetermined time is any time, but is preferably short enough that the user does not recognize the transition time between categories before and after the change. To give an example, in the display device 100 in which the display output is updated at 60 frames per second, the predetermined time is preferably a time of approximately 10 frame periods (1/6 second).

As described above, the gradation controller 72 outputs the display output signal OP. Specifically, the display output signal OP reflects the gradation value control for performing the display output corresponding to the frame image data IP using the light from the light source device 11 with the degree of lighting controlled according to the light source control signal DP. Therefore, when the category reflected in the light source control signal DP changes, as in the case of the predetermined time described above, the gradation values reflected in the display output signal OP can also change according to the change of category.

The transition information 720 may be controlled such that information indicating the category before the change is held until the change of the category is completed, or information indicating the intermediate category may be written as the transition information 720 each time an intermediate category is applied. In any case, the control of the light source device 11 before and after the change of category only needs to be established as described with reference to the target information 719 and the transition information 720 in terms of the reduction of the color breaking, as described with reference to FIG. 12.

During the period Ti2 after the time Ta in FIG. 12, the light source control signal DP corresponding to the first category Ct1 is continuously output after the first category Ct1 is applied to the lighting pattern of the light source device 11 until the time Tb at which the display output changes again.

In FIG. 12, the display output transitions from the first image CP1 to a second image CP2 at the time Tb. The second image CP2 includes a red area DpR, a cyan area DpC, and the white area DpW. The red area DpR is reproduced by the scattering of the red light at high luminance. The cyan area DpC is reproduced by the scattering of the green light at high luminance and the blue light at high luminance. The white area DpW is reproduced by the scattering of the red light at high luminance, the green light at high luminance, and the blue light at high luminance, in the same manner as in the case of the first image CP1.

At the time Tb, the color information acquirer 711 acquires color information on the second image CP2. The category verifier 712 samples the color information on the second image CP2 and verifies whether color reproduction of the second image CP2 is possible in each of the first category Ct1, the second category Ct2, and the third category Ct3. It is herein assumed that the color information on the red area DpR, the cyan area DpC, and the white area DpW have all been included in the sampling.

The second category Ct2 can reproduce the red area DpR, the cyan area DpC, and the white area DpW. In contrast, the first category Ct1 and the third category Ct3 cannot reproduce the red area DpR. Therefore, the usable category extractor 713 extracts the second category Ct2 as a usable category. As described above, the information indicating the degree of priority is also added to the information indicating the usable categories, but, in the example at time Tb, only the second category Ct2 is the usable category, so that the target category selector 714 automatically selects the second category Ct2 as the target category. Therefore, during the period Ti3, the target information 719 is information indicating the second category Ct2. In FIG. 12, the target category after the time Tb is the second category Ct2. If the first category Ct1 is also a usable category, the first category Ct1 is selected because the first category Ct1 has a higher degree of priority than the second category Ct2.

Also after the time Tb, in the same manner as after the time Ta, intermediate categories before and after the change of the category are applied. That is, in the first embodiment, when the category changes, the color breaking can be further reduced by applying the intermediate categories before and after the change of the category.

However, in the example illustrated in FIG. 12, the category before the time Tb is the first category Ct1 and the category after time Tb is the second category Ct2. Thus, unlike the transition of categories starting at time Ta, the category before the change is not the tenth category Ct0. Therefore, in the first embodiment, when the category before the change is not the tenth category Ct0, the tenth category Ct0 may be produced as an intermediate category.

The lighting pattern after the time Tb illustrated in FIG. 12 transitions in the order of the category Ct01, the tenth category Ct0, a category Ct02, and the second category Ct2. Therefore, from the first category Ct1 before the time Tb to the tenth category Ct0 after the time Tb, the lighting pattern of the light source device 11 transitions in the reverse order to that before and after the change of category at time Ta, thereby further reducing the color breaking.

A period of third cyan C3, a period of fourth cyan C4, and the period of the first red Ra are generated in one frame period to establish the category Ct02. The period of the third cyan C3 and the period of the fourth cyan C4 are periods when the second and the third light sources 11G and 11B are on and the first light source 11R is off. However, the luminance of the second light source 11G and the luminance of the third light source 11B are different between the third cyan C3 and the fourth cyan C4. In the third cyan C3, the luminance of the second light source 11G is relatively higher than that of the third light source 11B. In the fourth cyan C4, the luminance of the third light source 11B is relatively higher than that of the second light source 11G. Furthermore, the luminance of the second light source 11G is relatively higher and the luminance of the third light source 11B is relatively lower for the third cyan C3 than for the first cyan C1. In addition, the luminance of the third light source 11B is relatively higher and the luminance of the second light source 11G is relatively lower for the fourth cyan C4 than for the second cyan C2.

The tenth category Ct0, the category Ct02, and the second category Ct2 are common in that the period of the first red Ra is generated. Therefore, during a transitional period through these categories, no change occurs in that the first light source 11R is lit at high luminance during the period of the first red Ra. In contrast, the tenth category Ct0 differs from the second category Ct2 in that the period of the first green Ga and the period of the first blue Ba are generated in the tenth category Ct0 while the period of first cyan C1 and the period of the second cyan C2 are generated in the second category Ct2. The category Ct02 serves as an intermediate category between the tenth category Ct0 and the second category Ct2 and acts so as to moderate the change in luminance of the second light source 11G and the third light source 11B during the transitional period. As a result, the color breaking can be further reduced.

In this manner, during the transitional period before and after the change of category, a time may be provided in which the control of the light source device 11 corresponding to the tenth category Ct0 is applied. That is, a time may be provided in which a lighting pattern of providing the following lighting periods is applied: a lighting period during which the first light source 11R is lit at the highest luminance and the second and the third light sources 11G and 11B are unlit; a lighting period during which the second light source 11G is lit at the highest luminance and the first and the third light sources 11R and 11B are unlit; and a lighting period during which the third light source 11B is lit at the highest luminance and the first and the second light sources 11R and 11G are unlit. Based on the same concept, the target category and the lighting pattern are in the tenth category Ct0 during the period Ti1 when the display output is in the colorless state Bak. That is, the change in luminance in the transition from the tenth category Ct0 to other categories can easily be moderated. Therefore, when it is not known which category is appropriate after the period Ti1, the tenth category Ct0 is employed so that all categories can be dealt with.

The intermediate categories need not include the tenth category Ct0. For example, another category different from the tenth category Ct0 may be applied as an intermediate category between the first category Ct1 and the second category Ct2, as illustrated in AnP in FIG. 12. FIG. 12 illustrates a category Ct8 as the other category. A period of a mixed color BC2, a period of a mixed color RY2, and a period of a mixed color GW2 are generated in one frame period to establish the category Ct8 (refer to an eighth category in FIG. 13).

The period of the mixed color BC2 is a period when the second and the third light sources 11G and 11B are on and the first light source 11R is off. In the mixed color BC2, the luminance of the third light source 11B is relatively higher than that of the second light source 11G. The period of the mixed color RY2 is a period when the first and the second light sources 11R and 11G are on and the third light source 11B is off. In the mixed color RY2, the luminance of the first light source 11R is relatively higher than that of the second light source 11G. The period of the mixed color GW2 is a period when the first, the second, and the third light sources 11R, 11G, and 11B are on. In the mixed color GW2, the luminance of the second light source 11G is relatively higher than that of the first and the third light sources 11R and 11B. The luminance of the first light source 11R is equal to that of the third light source 11B in the mixed color GW2.

If the category after the transition of the display output, that is, after the change of the category, is the tenth category Ct0, for example, the lighting pattern only needs to be changed so as to achieve a transition from the first category Ct1 via the category Ct01 to the tenth category Ct0 after the time Tb.

The type of the intermediate category to be applied is determined in advance according to the categories before and after the change. The computer program, and so forth, of the method for determining such intermediate categories may be pre-implemented in the employed category determiner 715, or may be stored in a storage device or a storage circuit not illustrated in the drawings and provided so as to be referable from the employed category determiner 715.

The direction of transition in hue of the color of the light source that is made in one frame period is the same among categories before and after the change and the intermediate categories. For example, suppose that a rule is determined in advance to make the first light source 11R relatively most luminous in the lighting period LP1 described with reference to FIG. 3, the second light source 11G relatively most luminous in the lighting period LP2, and the third light source 11B relatively most luminous in the lighting period LP3. In this case, the categories included in the category information 717 satisfy the rule. The intermediate categories that can be reflected in the light source control signal DP by the employed category determiner 715 are also generated by the employed category determiner 715 so as to satisfy the rule. The relation between each of the lighting periods LP1, LP2, and LP3 and the color of the most luminous light source in the rule can be changed as appropriate.

As described above, a display device according to the first embodiment includes a light source device (for example, the light source device 11) including a first light source (for example, the first light source 11R) that emits light in a first color, a second light source (for example, the second light source 11G) that emits light in a second color, and a third light source (for example, the third light source 11B) that emits light in a third color, a display (for example, the display panel P, in particular, the display 7 provided with the pixels Pix) that performs color reproduction according to input data (for example, the frame image data IP) from outside by using light from the light source device, a storage (for example, the storage 716) that stores data (for example, the category information 717) indicating lighting pattern of the first light source, the second light source, and the third light source, and a controller (for example, the image processing circuit 70 including the lighting controller 71) that controls the lighting pattern of the first light source, the second light source, and the third light source based on the input data and the data in the storage. The controller generates n lighting periods (such as the lighting periods LP1, LP2, and LP3) during a display output period of a frame image that is output by the display. The number n is a natural number of three or larger (for example, n=3). The colors of the light emitted from the light source device in the n lighting periods differ from one another. The data includes information indicating a plurality of types of the lighting patterns (such as the first category Ct1, the second category Ct2, the third category Ct3, and the tenth category Ct0) that can reproduce different color gamuts in the n lighting periods. When the color reproduction by the display changes, the controller controls the lighting pattern of the first light source, the second light source, and the third light source based on the difference between the lighting pattern for color reproduction corresponding to the input data before the change and the lighting pattern for color reproduction corresponding to the input data after the change.

With this operation, any one of the plurality of types of the lighting patterns that can reproduce different color gamuts can be applied to the control of the light source device (such as the light source device 11). Furthermore, the control of the light source device can reflect the difference in lighting pattern for color reproduction corresponding to the input data (such as the frame image data IP) between before and after the change. Therefore, the color breaking can be further reduced by applying a lighting pattern that is less likely to cause the color breaking to at least either before or after the change.

The controller (image processing circuit 70) produces the transitional period between the first time and the second time. The first time is time when a lighting pattern for color reproduction corresponding to the input data before the change (for example, the frame image data IP before the change or a state where the frame image data IP is not received) is applied. The second time is time when a lighting pattern for color reproduction corresponding to the input data after the change (for example, the frame image data IP before the change) is applied. The transitional period is a period in which a lighting pattern different from both that of the first time and that of the second time is applied. This operation can also further reduce the color breaking. In this case, a first difference and a second difference are smaller than a third difference. The first difference is the difference between the color of the light emitted from the light source device (such as the light source device 11) during the transitional period and the color of the light emitted from the light source device at the first time. The second difference is the difference between the color of the light emitted from the light source device during the transitional period and the color of the light emitted from the light source device at the second time. The third difference is the difference between the color of the light emitted from the light source device at the first time and the color of the light emitted from the light source device at the second time. Therefore, the degree of the visibility of the difference of light between the first time and the second time can be more reduced than in the case of no transitional period. Thus, the color breaking can be further reduced.

In addition, during the transitional period described above, a time is provided in which a lighting pattern for providing the following lighting periods is applied: a lighting period during which the first light source (such as the first light source 11R) is lit at the highest luminance and the second light source (such as the second light source 11G)

and the third light source (such as the third light source 11B) are unlit; a lighting period during which the second light source is lit at the highest luminance and the first and the third light sources are unlit; and a lighting period during which the third light source is lit at the highest luminance and the first and the second light sources are unlit. With this configuration, the degree of the visibility of the difference between the light in the lighting pattern of the first time and light in the lighting pattern of the second time described above can be further reduced. Thus, the color breaking can be further reduced.

The data (such as the category information 717) includes information indicating a lighting pattern of producing a lighting period in which any one of the first light source (such as the first light source 11R), the second light source (such as the second light source 11G), and the third light source (such as the third light source 11B) is lit at the highest luminance and the other two are unlit. For example, in the description with reference to FIG. 11, the first category Ct1, the second category Ct2, the third category Ct3, and the tenth category Ct0 correspond to such a lighting pattern. Such a lighting pattern can more reliably reproduce colors that correspond to the colors of the light emitted from the light sources that are lit at the highest luminance.

The data (such as the category information 717) includes information indicating a lighting pattern of producing two lighting periods in each of which two of the first light source (such as the first light source 11R), the second light source (such as the second light source 11G), and the third light source (such as the third light source 11B) are lit and the other one is unlit, where the luminance ratio between the two light sources that are lit differs between the two lighting periods. For example, in the description with reference to FIG. 11, the first category Ct1, the second category Ct2, and the third category Ct3 correspond to such a lighting pattern. Such a lighting pattern can further reduce the degree of the visibility of the difference of light between the two lighting periods. Thus, the color breaking can be further reduced.

Each of the plurality of types of the lighting patterns included in the data (such as the category information 717) is given a predetermined degree of priority. The controller (such as the image processing circuit 70) applies, to the control of the light source device (such as the light source device 11), a lighting pattern having the highest degree of priority among the lighting patterns with which the colors to be reproduced corresponding to the gradation values indicated by the pixel data included in the input data (such as the frame image data IP) can be reproduced. As a result, the color breaking can be reduced more easily by giving a higher degree of priority to the lighting pattern that can further reduce the color breaking.

One of the first, the second, and the third colors (for example, the first color) is red (R). One of the first, the second, and the third colors that is not red (R) is green (G). One of the first, the second, and the third colors that is neither red nor green is blue (B). As a result, sufficient color reproduction can be achieved.

The display (such as the display panel P) is a liquid crystal panel in which the polymer-dispersed liquid crystal is enclosed. This configuration can further reduce the color breaking in the liquid crystal panel that can switch between transmission and scattering of light.

First Modification

Figure 13:
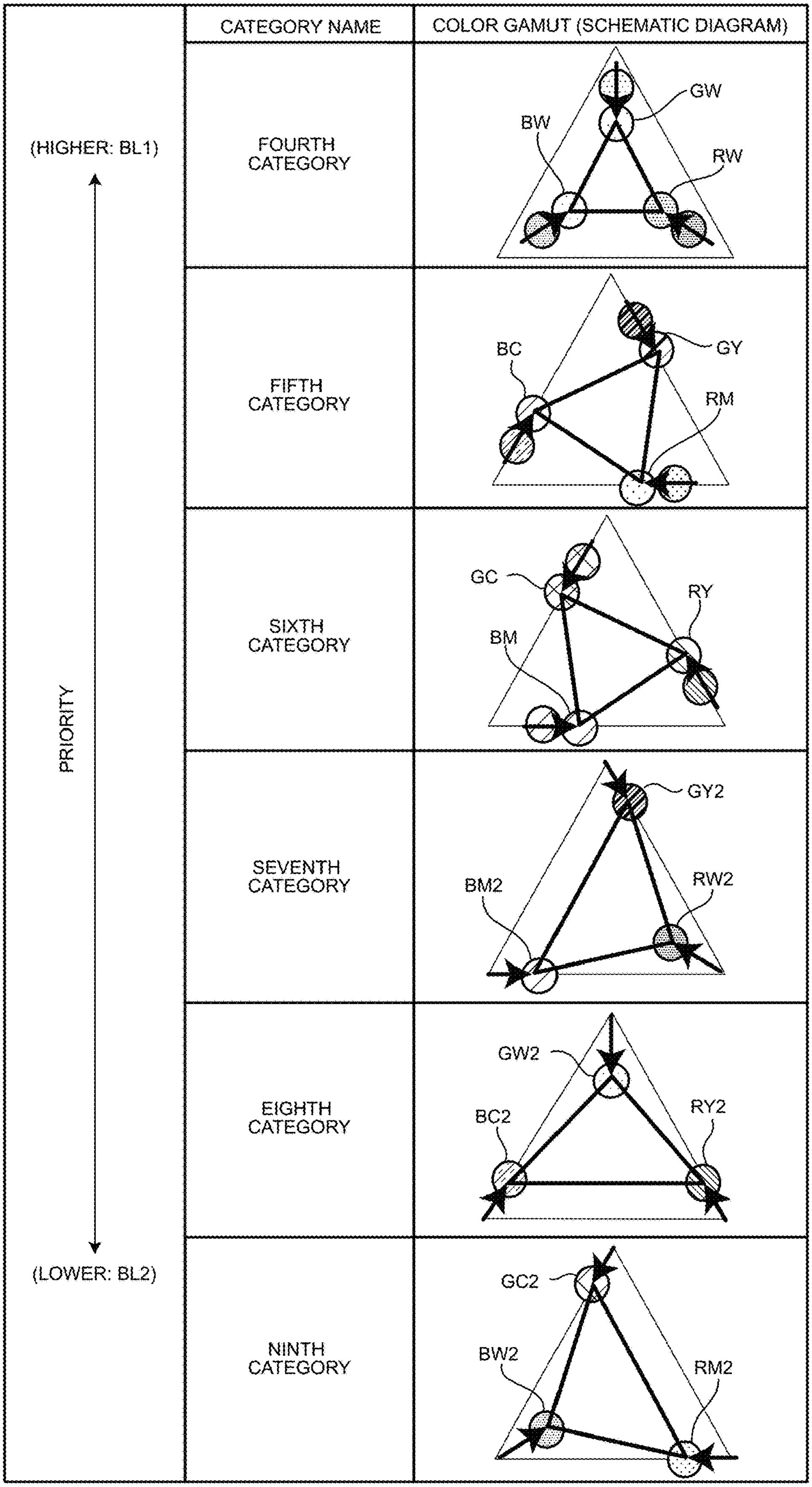
FIG. 13 is a chart illustrating an exemplary relation between types of categories added in a first modification and the degrees of priority of employment.

The following describes a first modification that is a modification of the first embodiment, with reference to FIG. 13. In the description according to the first modification, the same matters as those of the first embodiment are denoted by the same reference numerals, and will not be described.

FIG. 13 is a chart illustrating an exemplary relation between the types of categories added in the first modification and the degrees of priority of employment. In the first modification, the category information 717 may further include information indicating a fourth category, a fifth category, a sixth category, a seventh category, an eighth category, and a ninth category illustrated in FIG. 13 in addition to the first category Ct1, the second category Ct2, the third category Ct3, and the tenth category Ct0 described with reference to FIG. 11 in the description according to the first embodiment.

A period of a mixed color RW, a period of a mixed color GW, and a period of a mixed color BW are generated in one frame period to establish the fourth category. The period of the mixed color RW, the period of the mixed color GW, and the period of the mixed color BW are periods when the first, the second, and the third light sources 11R, 11G, and 11B are on. In the mixed color RW, the luminance of the first light source 11R is relatively higher than that of the second light source 11G and the third light source 11B. The luminance of the second light source 11G is equal to that of the third light source 11B in the mixed color RW. In the mixed color GW, the luminance of the second light source 11G is relatively higher than that of the first light source 11R and the third light source 11B. The luminance of the first light source 11R is equal to that of the third light source 11B in the mixed color GW. In the mixed color BW, the luminance of the third light source 11B is relatively higher than that of the first light source 11R and the second light source 11G. The luminance of the first light source 11R is equal to that of the second light source 11G in the mixed color BW.

A period of a mixed color BC, a period of a mixed color GY, and a period of a mixed color RM are generated in one frame period to establish the fifth category. The period of the mixed color BC is a period when the second and the third light sources 11G and 11B are on and the first light source 11R is off. In the mixed color BC, the luminance of the third light source 11B is relatively higher than that of the second light source 11G. The period of the mixed color GY is a period when the first and the second light sources 11R and 11G are on and the third light source 11B is off. In the mixed color GY, the luminance of the second light source 11G is relatively higher than that of the first light source 11R. The period of the mixed color RM is a period when the first and the third light sources 11R and 11B are on and the second light source 11G is off. In the mixed color RM, the luminance of the first light source 11R is relatively higher than that of the third light source 11B.

A period of a mixed color GC, a period of a mixed color RY, and a period of a mixed color BM are generated in one frame period to establish the sixth category. The period of the mixed color GC is a period when the second and the third light sources 11G and 11B are on and the first light source 11R is off. In mixed-color GC, the luminance of the second light source 11G is relatively higher than that of the third light source 11B. The period of the mixed color RY is a period when the first and the second light sources 11R and 11G are on and the third light source 11B is off. In the mixed color RY, the luminance of the first light source 11R is relatively higher than that of the second light source 11G. The period of the mixed color BM is a period when the first and the third light sources 11R and 11B are on and the second light source 11G is off. In the mixed color BM, the luminance of the third light source 11B is relatively higher than that of the first light source 11R.

A period of a mixed color BM2, a period of a mixed color GY2, and a period of a mixed color RW2 are generated in one frame period to establish the seventh category. The period of the mixed color BM2 is a period when the first and the third light sources 11R and 11B are on and the second light source 11G is off. In the mixed color BM2, the luminance of the third light source 11B is relatively higher than that of the first light source 11R. The period of the mixed color GY2 is a period when the first and the second light sources 11R and 11G are on and the third light source 11B is off. In the mixed color GY2, the luminance of the second light source 11G is relatively higher than that of the first light source 11R. The period of the mixed color RW2 is a period when the first, the second, and the third light sources 11R, 11G, and 11B are on. In the mixed color RW2, the luminance of the first light source 11R is relatively higher than that of the second light source 11G and the third light source 11B. The luminance of the second light source 11G is equal to that of the third light source 11B in the mixed color RW2.

The eighth category is the same as the category Ct8 described with reference to FIG. 12 in the first embodiment.

A period of a mixed color RM2, a period of a mixed color GC2, and a period of a mixed color BW2 are generated in one frame period to establish the ninth category. The period of the mixed color RM2 is a period when the first and the third light sources 11R and 11B are on and the second light source 11G is off. In the mixed color RM2, the luminance of the first light source 11R is relatively higher than that of the third light source 11B. The period of the mixed color GC2 is a period when the second and the third light sources 11G and 11B are on and the first light source 11R is off. In the mixed color GC2, the luminance of the second light source 11G is relatively higher than that of the third light source 11B. The period of the mixed color BW2 is a period when the first, the second, and the third light sources 11R, 11G, and 11B are on. In the mixed color BW2, the luminance of the third light source 11B is relatively higher than that of the first light source 11R and the second light source 11G. The luminance of the first light source 11R is equal to that of the second light source 11G in the mixed color BW2.

The categories illustrated in FIG. 13 are listed in the order from the highest degree of priority as follows: the fourth category, the fifth category, the sixth category, the seventh category, the eighth category, and the ninth category. The fourth category has a lower degree of priority than the third category Ct3. The ninth category has a higher degree of priority than the tenth category Ct0. Therefore, the degrees of priority of the categories in the first modification can be illustrated by inserting FIG. 13 between two boundaries BL1 and BL2 between the third category Ct3 and the tenth category Ct0 illustrated in FIG. 11.

The first modification is the same as the first embodiment except for the matters noted above. According to the first modification, the data (such as the category information 717) includes information indicating a lighting pattern of producing the following lighting periods: a lighting period during which the first light source (such as the first light source 11R) and the second light source (such as the second light source 11G) are on (lit) and the third light source (such as the third light source 11B) is off (unlit); a lighting period during which the second light source and the third light source are on (lit) and the first light source is off (unlit); and a lighting period during which the first light source and the third light source are on (lit) and the second light source is off (unlit). In the description with reference to FIG. 13, the fifth and the sixth categories correspond to such a lighting pattern. Such a lighting pattern can more reduce the degree of the visibility of the difference of light between the lighting periods than the lighting pattern in which the first, the second, and the third light sources are on (lit) at the highest luminance. Thus, the color breaking can be further reduced.

The data (such as the category information 717) also includes information indicating a lighting pattern of producing three lighting periods during which the first light source (such as the first light source 11R), the second light source (such as the second light source 11G), and the third light source (such as the third light source 11B) are on (lit), where the ratio of the luminance of the first light source to the luminance of the second light source to the luminance of the third light source is different between the three lighting periods. In the description with reference to FIG. 13, the fourth category corresponds to such a lighting pattern. Such a lighting pattern can more reduce the degree of the visibility of the difference of light between the lighting periods than the lighting pattern in which the first, the second, and the third light sources are on (lit) at the highest luminance. Thus, the color breaking can be further reduced.

Second Embodiment

Figure 14:
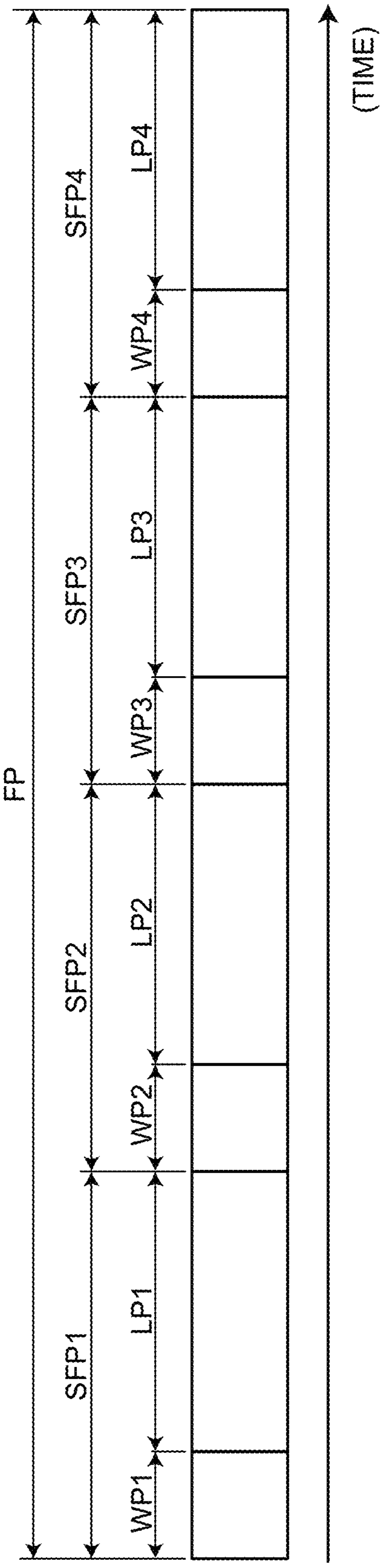
FIG. 14 is a schematic diagram illustrating the FSC system applied in a second embodiment of the present disclosure.
Figure 15:
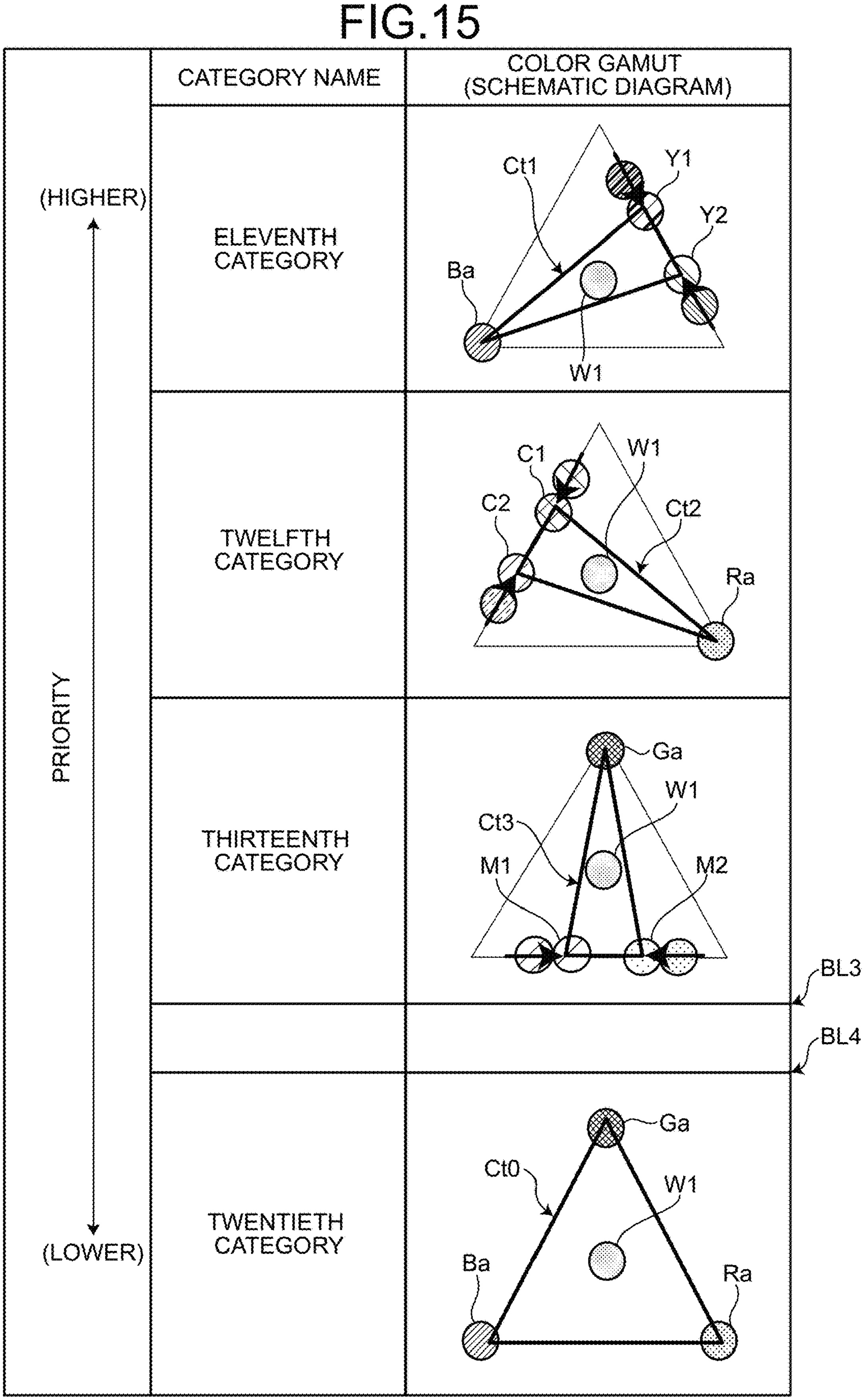
FIG. 15 is a chart illustrating an exemplary relation between types of categories and the degrees of priority of employment in the second embodiment.

The following describes a second embodiment of the present disclosure that partially differs from the first embodiment, with reference to FIGS. 14 and 15. In the description according to the second embodiment, the same matters as those of the first embodiment are denoted by the same reference numerals, and will not be described.

FIG. 14 is a schematic diagram illustrating the FSC system applied in the second embodiment. The frame period FP in the second embodiment includes a sub-frame period SFP4 in addition to the sub-frame periods SFP1, SFP2, and SFP3 described with reference to FIG. 3. The sub-frame period SFP4 includes a writing period WP4 and a lighting period LP4 after the writing period WP4. The writing period WP4 is a writing period. The lighting period LP4 is a lighting period. That is, n=4 in the present embodiment. Thus, in the second embodiment, four periods are set in the information indicating categories included in the category information 717. The following describes the categories in the second embodiment with reference to FIG. 15.

FIG. 15 is a chart illustrating an exemplary relation between the types of categories and the degrees of priority of employment in the second embodiment. FIG. 15 illustrates an eleventh category, a twelfth category, a thirteenth category, and a twentieth category as categories that can be used in the second embodiment.

The period of the first yellow Y1, the period of the second yellow Y2, the period of the first blue Ba, and a period of first white W1 are generated in one frame period to establish the eleventh category.

The period of first cyan C1, the period of the second cyan C2, the period of the first red Ra, and the period of the first white W1 are generated in one frame period to establish the twelfth category.

The period of the first magenta M1, the period of the second magenta M2, the period of the first green Ga, and the period of the first white W1 are generated in one frame period to establish the thirteenth category.

The period of the first red Ra, the period of the first green Ga, the period of the first blue Ba, and the period of the first white W1 are generated in one frame period to establish the twentieth category.

The period of the first white W1 is a period when the first light source 11R, the second light source 11G, and the third light source 11B are on. In the first white W1, the luminance of the first light source 11R, the luminance of the second light source 11G, and the luminance of the third light source 11B are equal to one another.

The categories that can be employed in the second embodiment are set to have a higher luminance component of white (W) than that of the categories that can be employed in the first embodiment, when viewed in one frame period. Specifically, in the eleventh, twelfth, thirteenth, and twentieth categories illustrated in FIG. 15, the luminance component of white (W) is the same as that of the tenth category Ct0 of the first embodiment in three periods except the period of the first white W1. In this case, the color reproduction of white (W) by the first white W1 is further performed, so that the luminance component of white (W) becomes higher than in the case of the tenth category Ct0. More specifically, the first white W1 corresponds to the lighting pattern of the light source device 11 in which the first, the second, and the third light sources 11R, 11G, and 11B are lit at 20% luminance (0.2). In other words, the percentage of the luminance of the first, the second, and the third light sources 11R, 11G, and 11B in the first white W1 is the percentage of the luminance component of white (W) that is increased in the category of the second embodiment as compared with the category of the first embodiment. The percentage is not limited to 20% (0.2), but can be changed as appropriate.

In the second embodiment, the first category Ct1 in the first embodiment is replaced with the eleventh category. In the second embodiment, the second category Ct2 in the first embodiment is replaced with the twelfth category. In the second embodiment, the third category Ct3 in the first embodiment is replaced with the thirteenth category. In the second embodiment, the tenth category Ct0 in the first embodiment is replaced with the twentieth category.

Furthermore, in the second embodiment, the categories on the assumption that n=4 are applied also in the intermediate categories described with reference to FIG. 12. For example, the categories applied in the second embodiment can be explained by adding the period of the first white W1 to each of the categories described with reference to FIG. 12.

The second embodiment is the same as the first embodiment except for the matters noted above. According to the second embodiment, the number n indicating the number of the lighting periods (such as the lighting periods LP1, LP2, LP3, and LP4) is four or larger (for example, n=4). The data (such as the category information 717) includes information indicating a lighting pattern of producing a lighting period during which the first light source (such as the first light source 11R), the second light source (such as the second light source 11G), and the third light source (such as the third light source 11B) are on. In the description with reference to FIG. 15, the eleventh category, the twelfth category, the thirteenth category, and the twentieth category correspond to such a lighting pattern. The term "lighting period during which the first light source (such as the first light source 11R), the second light source (such as the second light source 11G), and the third light source (such as the third light source 11B) are on (lit)" refers herein, for example, to the period of the first white W1 described above. As a result, the brightness of the image to be displayed can be more easily increased.

Second Modification

Figure 16:
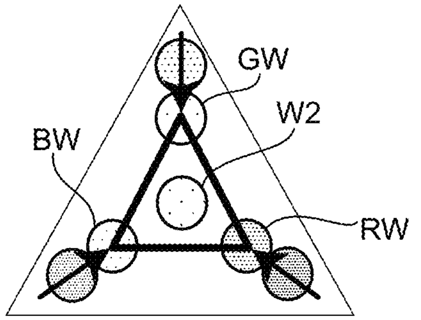
FIG. 16 is a chart illustrating an exemplary relation between types of categories added in a second modification and the degrees of priority of employment.
Figure 16:
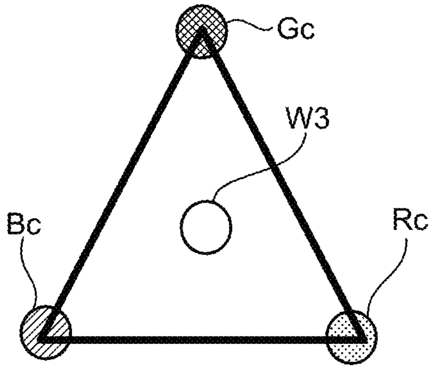

The following describes a second modification that is a modification of the second embodiment, with reference to FIG. 16. In the description according to the second modification, the same matters as those of the second embodiment are denoted by the same reference numerals, and will not be described.

FIG. 16 is a chart illustrating an exemplary relation between the types of categories added in the second modification and the degrees of priority of employment. In the second modification, the category information 717 may further include information indicating a fourteenth category and a fifteenth category illustrated in FIG. 16 in addition to the eleventh, twelfth, thirteenth, and twentieth categories described with reference to FIG. 15.

The period of the mixed color RW, the period of the mixed color GW, the period of the mixed color BW, and a period of a second white W2 are generated in one frame period to establish the fourteenth category. The second white W2 may be the same as the first white W1, or the luminance of the first, the second, and the third light sources 11R, 11G, and 11B may differ from that of the first white W1. However, the luminance of white (W) is preferably adjusted to be equal to the luminance of the other categories in terms of the whole of the period of the mixed color RW, the period of the mixed color GW, the mixed color BW, and the period of the second white W2.

A period of third red Rc, a period of third green Gc, a period of third blue Bc, and a period of third white W3 are generated in one frame period to establish the fifteenth category. The third red Rc corresponds to a lighting pattern of the light source device 11 in which the first light source 11R is lit at lower luminance than the first red Ra, and the second and the third light sources 11G and 11B are unlit. The third green Gc corresponds to a lighting pattern of the light source device 11 in which the second light source 11G is lit at lower luminance than the first green Ga, and the first and the third light sources 11R and 11B are unlit. The third blue Bc corresponds to a lighting pattern of the light source device 11 in which the third light source 11B is lit at lower luminance than the first blue Ba, and the second and the third light sources 11G and 11B are unlit. The third white W3 is a lighting pattern of the light source device 11 in which the first, the second, and the third light sources 11R, 11G, and 11B are lit at higher luminance than the first white W1. In the fifteenth category, the luminance of white (W) is preferably adjusted to be equal to that of the other categories in terms of the whole of the period of the third red Rc, the period of the third green Gc, the period of the third blue Bc, and the period of the third white W3.

The fourteenth category has a lower degree of priority than the thirteenth category (refer to FIG. 15), but a higher degree of priority than the fifteenth category. The fifteenth category has a higher degree of priority than the twentieth category (refer to FIG. 15). Therefore, the degrees of priority of the categories in the second modification can be illustrated by inserting FIG. 16 between two boundaries BL3 and BL4 between the thirteenth category and the twentieth category illustrated in FIG. 15. The second modification is the same as the second embodiment except for the matters noted above. The second modification can further reduce the color breaking in the same manner as the first modification described above.

Third Modification

Figure 17:
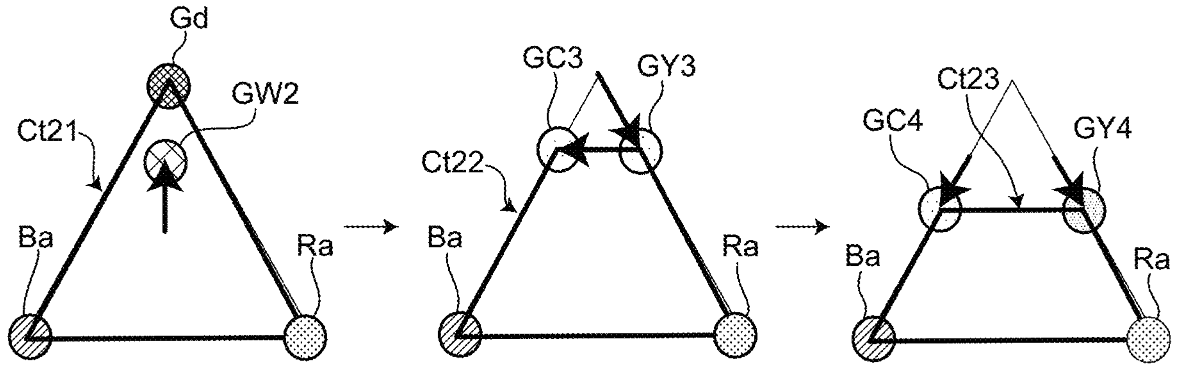
FIG. 17 is a diagram illustrating an exemplary transition of categories in a third modification.
Figure 18:
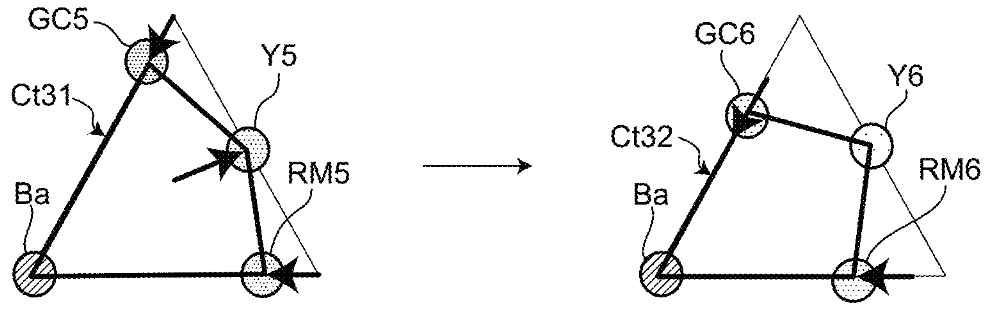
FIG. 18 is a diagram illustrating an exemplary transition of categories in the third modification.

The following describes a third modification that is a modification of the second embodiment, with reference to FIGS. 17 and 18. In the description according to the third modification, the same matters as those of the second embodiment are denoted by the same reference numerals, and will not be described. Both the second modification and the third modification may be applied to the second embodiment.

FIGS. 17 and 18 are diagrams illustrating exemplary transitions of categories in the third modification. FIGS. 17 and 18 illustrate the exemplary transitions of categories when the twentieth category described with reference to FIG. 15 is a category before being changed. For example, assuming a case where a category Ct23 illustrated in FIG. 17 is a category after being changed, the color breaking can be further reduced by sequentially generating (providing) a category Ct21 and a category Ct22 between the twentieth category and the category Ct23.

The period of the first red Ra, the period of the first blue Ba, a period of fourth green Gd, and the period of the mixed color GW2 are generated in one frame period to establish the category Ct21. The fourth green Gd corresponds to a lighting pattern of the light source device 11 in which the second light source 11G is lit at lower luminance than the first green Ga, and the first and the third light sources 11R and 11B are unlit.

The period of the first red Ra, the period of the first blue Ba, a period of a mixed color GC3, and a period of a mixed color GY3 are generated in one frame period to establish the category Ct22. The mixed color GC3 corresponds to a lighting pattern of the light source device 11 in which the second and the third light sources 11G and 11B are lit and the first light source 11R is unlit. The mixed color GY3 corresponds to a lighting pattern of the light source device 11 in which the first and the second light sources 11R and 11G are lit and the third light source 11B is unlit. In each of the mixed colors GC3 and GY3, the luminance of the second light source 11G is relatively higher than that of the light source for the other color that is lit.

The period of the first red Ra, the period of the first blue Ba, a period of a mixed color GC4, and a period of a mixed color GY4 are generated in one frame period to establish the category Ct23. The mixed color GC4 corresponds to a lighting pattern of the light source device 11 in which the second and the third light sources 11G and 11B are lit and the first light source 11R is unlit. The mixed color GY4 corresponds to a lighting pattern of the light source device 11 in which the first and the second light sources 11R and 11G are lit and the third light source 11B is unlit. In each of the mixed colors GC4 and GY4, the luminance of the second light source 11G is relatively higher than that of the light source for the other color that is lit. In each of the mixed colors GC4 and GY4, the luminance of the second light source 11G is relatively lower and the luminance of the light source for the other color that is lit is relatively higher, compared with the mixed colors GC3 and GY3.

In the category Ct23, the luminance of the second light source 11G in the mixed color GC4 and the luminance of the second light source 11G in the mixed color GY4 are preferably adjusted so as to achieve the color reproduction in which the total of the luminance of the second light source 11G in the mixed color GC4 and the luminance of the second light source 11G in the mixed color GY4 is equal to the luminance of the first green Ga.

Assuming that the category Ct32 illustrated in FIG. 18 is a category after being changed, the color breaking can be further reduced by producing a category Ct31 between the twentieth category and the category Ct32.

The period of the first blue Ba, a period of a mixed color GC5, a period of a mixed color RM5, and a period of fifth yellow Y5 are generated in one frame period to establish the category Ct31. The mixed color GC5 corresponds to a lighting pattern of the light source device 11 in which the second and the third light sources 11G and 11B are lit and the first light source 11R is unlit. In the mixed color GC5, the luminance of the second light source 11G is relatively higher than that of the third light source 11B. The mixed color RM5 corresponds to a lighting pattern of the light source device 11 in which the first and the third light sources 11R and 11B are lit and the second light source 11G is unlit. In the mixed color RM5, the luminance of the first light source 11R is relatively higher than that of the third light source 11B. The fifth yellow Y5 corresponds to a lighting pattern of the light source device 11 in which the first and the second light sources 11R and 11G are lit and the third light source 11B is unlit.

The period of the first blue Ba, a period of mixed color GC6, a period of a mixed color RM6, and a period of sixth yellow Y6 are generated in one frame period to establish the category Ct32. The mixed color GC6 corresponds to a lighting pattern of the light source device 11 in which the second and the third light sources 11G and 11B are lit and the first light source 11R is unlit. In the mixed color GC6, the luminance of the second light source 11G is relatively higher than that of the third light source 11B. In the mixed color GC6, the luminance of the second light source 11G is relatively lower than in the mixed color GC5. The mixed color RM6 corresponds to a lighting pattern of the light source device 11 in which the first and the third light sources 11R and 11B are lit and the second light source 11G is unlit. In the mixed color RM6, the luminance of the first light source 11R is relatively higher than that of the third light source 11B. In the mixed color RM6, the luminance of the first light source 11R is relatively lower than in the mixed color RM5. The sixth yellow Y6 corresponds to a lighting pattern of the light source device 11 in which the first and second light sources 11R and 11G are lit and the third light source 11B is unlit. In the sixth yellow Y6, the luminance of the first light source 11R and the second light source 11G is relatively higher than in the fifth yellow Y5.

In the category Ct32, the luminance of the second light source 11G in the sixth yellow Y6 and the luminance of the second light source 11G in the mixed color GC6 are preferably adjusted so as to achieve the color reproduction in which the total of the luminance of the second light source 11G in the sixth yellow Y6 and the luminance of the second light source 11G in the mixed color GC6 is equal to the luminance of the first green Ga. In the category Ct32, the luminance of the first light source 11R in the sixth yellow Y6 and the luminance of the second light source 11G in the mixed color RM6 are preferably adjusted so as to achieve the color reproduction in which the total of the luminance of the first light source 11R in the sixth yellow Y6 and the luminance of the second light source 11G in the mixed color RM6 is equal to the luminance of the first red Ra.

In the third modification, the category information 717 includes data indicating lighting patterns, such as the category Ct23 illustrated in FIG. 17 and the category Ct32 illustrated in FIG. 18. The category information 717 may include also data indicating lighting patterns, such as the category Ct21, the category Ct22, and the category Ct31, but the luminance of the light sources in each period included in each of the categories is preferably adjusted such that the balance of red (R), green (G), blue (B), and white (W) reproduced in one frame period is equal to that in other categories.

The third modification is the same as the second embodiment except for the matters noted above. According to third modification, the data (such as the category information 717) includes information indicating a lighting pattern of producing two lighting periods in each of which two of the first light source (such as the first light source 11R), the second light source (such as the second light source 11G), and the third light source (such as the third light source 11B) are lit and the other one is unlit, where the luminance ratio between the two light sources that are lit differs between the two lighting periods. In the description with reference to FIGS. 17 and 18, for example, the category Ct32 corresponds to such a lighting pattern. Such a lighting pattern can more reduce the degree of the visibility of the difference of light between the lighting periods than the lighting pattern in which the first, the second, and the third light sources are on (lit) at the highest luminance. Thus, the color breaking can be further reduced.

The embodiments and the modifications thereof described above are merely exemplary, and do not limit the specific configuration of the present disclosure. For example, n may be 5 or larger. In that case, a period corresponding to a natural number n equal to or larger than 5 is also set for the categories as appropriate.

The specific aspect of the display including the pixels Pix, such as the display 7, is not limited to the aspect using the PDLC, and other panels including a plurality of pixels capable of reflecting light may also be employed.

In addition, other operational advantages accruing from the aspects described in the embodiments, and the like, that are obvious or appropriately conceivable by those skilled in the art from the description in this specification will naturally be understood as accruing from the present disclosure.

What is claimed is:

1. A display device comprising:

a light source device comprising a first light source configured to emit light in a first color, a second light source configured to emit light in a second color, and a third light source configured to emit light in a third color;

a display configured to perform color reproduction based on input data from outside by using light from the light source device;

a storage configured to store data indicating a lighting pattern of the first light source, the second light source, and the third light source; and a controller configured to control the lighting pattern of the first light source, the second light source, and the third light source based on the input data and the data in the storage, wherein the controller is configured to produce n lighting periods during a display output period of a frame image that is output by the display, and n is a natural number of three or larger, wherein colors of light emitted from the light source device during the n lighting periods differ from one another, wherein the data comprises information indicating a plurality of types of lighting patterns capable of reproducing color gamuts different from one another in the n lighting periods, and wherein the controller is configured to control, when the color reproduction by the display changes, the lighting pattern of the first light source, the second light source, and the third light source based on a difference between the lighting pattern for the color reproduction corresponding to the input data before the change and the lighting pattern for the color reproduction corresponding to the input data after the change.

2. The display device according to claim 1, wherein the controller is configured to produce a transitional period between a first time and a second time, where the first time is time when the lighting pattern for the color reproduction corresponding to the input data before the change is applied, the second time is time when the lighting pattern for the color reproduction corresponding to the input data after the change is applied, and the transitional period is a period in which a lighting pattern different from both that of the first time and that of the second time is applied, and wherein a first difference and a second difference are smaller than a third difference, where the first difference is a difference between the color of the light emitted from the light source device during the transitional period and the color of the light emitted from the light source device at the first time, the second difference is a difference between the color of the light emitted from the light source device during the transitional period and the color of the light emitted from the light source device at the second time, and the third difference is a difference between the color of the light emitted from the light source device at the first time and the color of the light emitted from the light source device at the second time.

3. The display device according to claim 2, wherein during the transitional period, a time is provided in which a lighting pattern of producing three lighting periods is applied, and the three lighting periods are:

a lighting period during which the first light source is lit at highest luminance and the second and the third light sources are unlit;

a lighting period during which the second light source is lit at the highest luminance and the first and the third light sources are unlit; and a lighting period during which the third light source is lit at the highest luminance and the first and the second light sources are unlit.

4. The display device according to claim 1, wherein the data comprises information indicating a lighting pattern of producing a lighting period in which any one of the first light source, the second light source, and the third light source is lit at highest luminance and the other two are unlit.

5. The display device according to claim 4, wherein the data comprises information indicating a lighting pattern of producing two lighting periods in each of which two of the first light source, the second light source, and the third light source are lit and the other one is unlit, where a luminance ratio between the two light sources that are lit differs between the two lighting periods.

6. The display device according to claim 1, wherein the data comprises information indicating a lighting pattern of producing:

a lighting period during which the first light source and the second light source are lit and the third light source is unlit;

a lighting period during which the second light source and the third light source are lit and the first light source is unlit; and a lighting period during which the first light source and the third light source are lit and the second light source is unlit.

7. The display device according to claim 1, wherein the data comprises information indicating a lighting pattern of producing three lighting periods during each of which the first light source, the second light source, and the third light source are lit, where a ratio of a luminance of the first light source to a luminance of the second light source to a luminance of the third light source is different between the three lighting periods.

8. The display device according to claim 1, wherein n is four or larger, and wherein the data comprises information indicating a lighting pattern of producing a lighting period during which the first light source, the second light source, and the third light source are lit.

9. The display device according to claim 8, wherein the data comprises information indicating a lighting pattern of producing two lighting periods in each of which two of the first light source, the second light source, and the third light source are lit and the other one is unlit, where a luminance ratio between the two light sources that are lit differs between the two lighting periods.

10. The display device according to claim 1, wherein each of a plurality of types of the lighting patterns included in the data is given a predetermined degree of priority, and wherein the controller is configured to apply, to the control of the light source device, a lighting pattern having a highest degree of priority among the lighting patterns with which colors to be reproduced corresponding to gradation values indicated by pixel data included in the input data are reproducible.

11. The display device according to claim 1, wherein one of the first color, the second color, and the third color is red, wherein one of the first color, the second color, and the third color that is not red is green, and wherein one of the first color, the second color, and the third color that is neither red nor green is blue.

12. The display device according to claim 1, wherein the display is a liquid crystal panel enclosing a polymer-dispersed liquid crystal.

* * * * *